(12) United States Patent
Bruce et al.

(10) Patent No.: US 7,349,768 B2
(45) Date of Patent: Mar. 25, 2008

(54) EVACUATION ROUTE PLANNING TOOL

(75) Inventors: Alan E. Bruce, Kent, WA (US);
Kenneth A. Cobleigh, Issaquah, WA (US); Pauline Joe, Renton, WA (US)

(73) Assignee: The Boeing Company, Chicago, IL (US)

(*) Notice: Subject to any disclaimer, the term of this patent is extended or adjusted under 35 U.S.C. 154(b) by 393 days.

(21) Appl. No.: 11/113,943

(22) Filed: Apr. 25, 2005

(65) Prior Publication Data
US 2008/0046134 A1 Feb. 21, 2008

(51) Int. Cl.
*G06F 7/00* (2006.01)
(52) U.S. Cl. .......................... 701/1; 701/200
(58) Field of Classification Search ............ 701/1, 701/200–202, 208–209, 25–26; 707/1, 104.1; 340/988
See application file for complete search history.

(56) References Cited
U.S. PATENT DOCUMENTS
2001/0029425 A1  10/2001  Myr

| 2003/0236818 A1 | 12/2003 | Bruner |
| 2004/0030493 A1 | 2/2004 | Pechatnikov |
| 2005/0209770 A1* | 9/2005 | O'Neill et al. ............... 701/117 |
| 2005/0267651 A1* | 12/2005 | Arango et al. ................. 701/3 |

FOREIGN PATENT DOCUMENTS
| FR | 2760282 | 9/1998 |
| WO | 2004061737 | 7/2004 |
| WO | 2004097341 | 11/2004 |

\* cited by examiner

*Primary Examiner*—Yonel Beaulieu
(74) *Attorney, Agent, or Firm*—Gates & Cooper LLP

(57) ABSTRACT

A GIS-based system that determines evacuation routes for specific areas requiring evacuation. Evacuation and safe areas are determined, and evacuation routes plotted, based on emergency-specific information as well as road flow and estimated time of travel for each section of road between the evacuation area and safe area. Routes, evacuation areas, and safe areas are dynamically calculated and recalculated based on additional data, either real-time, historical, or other data added to the system, to compute optimal initial routes and redirect evacuees if changes in the emergency situation occur.

18 Claims, 18 Drawing Sheets

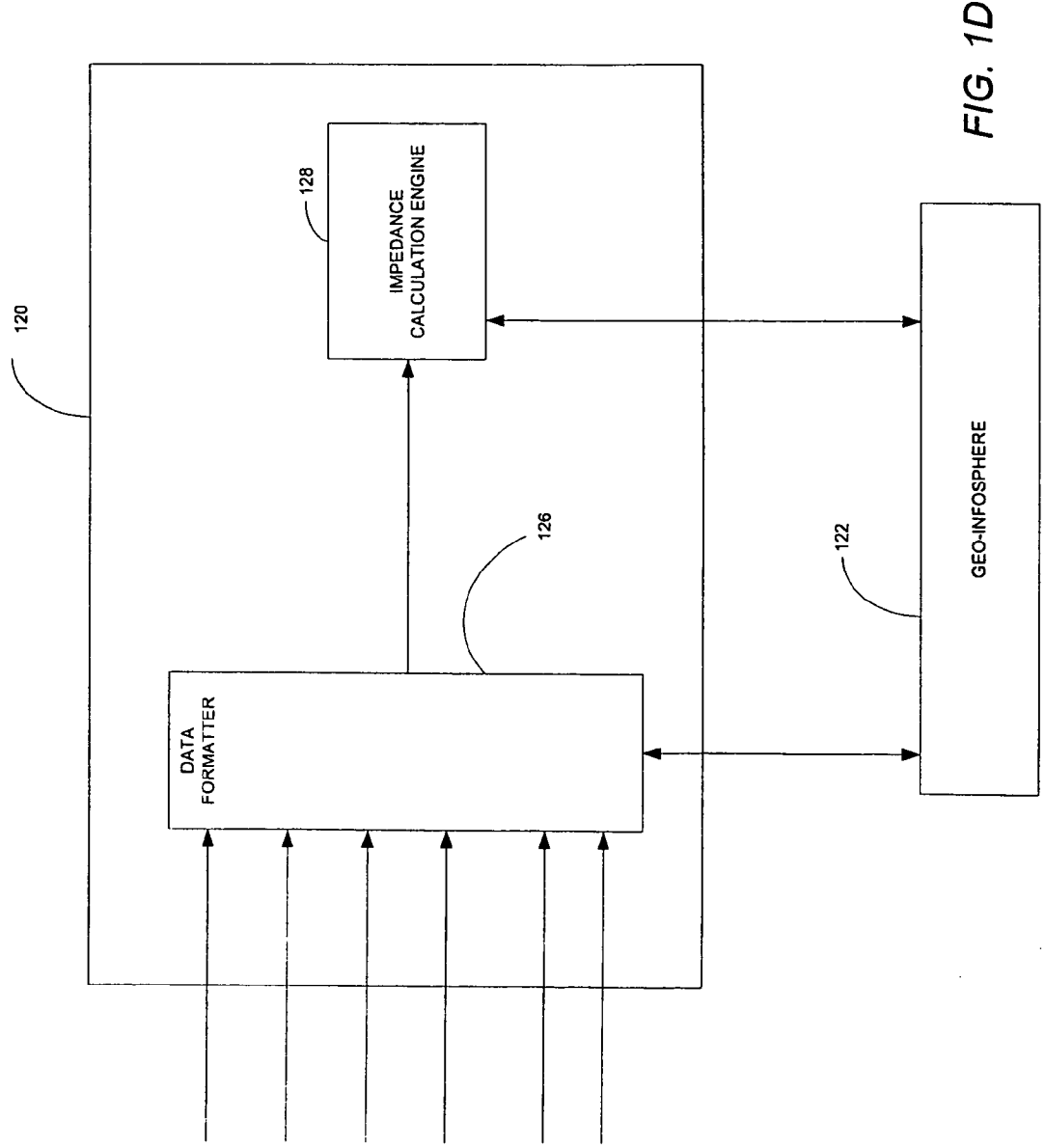

EVACUATION ROUTE PLANNING TOOL

CROSS-REFERENCE TO RELATED APPLICATIONS

This application is related to the following co-pending and commonly-assigned patent applications, which applications are incorporated by reference herein:

U.S. patent application Ser. No. 11/113,659, filed on the same date herewith, by Pauline Joe, Kenneth A. Cobleigh, and William F. Lyons, entitled "DYNAMIC ROUTING TOOL";

U.S. patent application Ser. No. 11/113,941, filed on the same date herewith, by Daniel J. Gadler, entitled "AGTM AIRBORNE SURVEILLANCE";

U.S. patent application Ser. No. 11/113,640, filed on the same date herewith, by Steven F. Cuspard, Daniel J. Gadler, Kenneth A Cobleigh, and Pauline Joe, entitled "ADVANCED GROUND TRANSPORTATION MANAGEMENT";

U.S. patent application Ser. No. 11/113,660, filed on the same date herewith, by Kenneth A. Cobleigh, Pauline Joe, Daniel J. Gadler, and Steven F. Cuspard, entitled "GEO-INFOSPHERE AS APPLIED TO DYNAMIC ROUTING SYSTEM"; and U.S. patent application Ser. No. 11/113,691, filed on the same date herewith, by Kenneth A. Cobleigh, Pauline Joe, Daniel J. Gadler, and James R. Hamilton, entitled "DATA FUSION FOR ADVANCED GROUND TRANSPORTATION SYSTEM".

BACKGROUND OF THE INVENTION

1. Field of the Invention

The present invention relates generally to ground transportation management, and in particular, to a method, apparatus, and article of manufacture for dynamically planning evacuation routes via ground transportation.

2. Background of the Invention

Many state and local agencies use Geographical Information System (GIS) databases to manage, plan, and record geographical information in their jurisdictions. For example, the placement of roads, sewers, and other municipal information that are used for planning and management purposes are kept in GIS databases. However, these GIS databases are used only to map these geographical data points for realty purposes, e.g., to know where a public road ends and a private road begins, to know where a sewer line is for purposes of repair, etc. Each municipality typically updates these databases as repairs are undertaken and completed.

Municipalities also operate safety departments such as police, fire, and paramedic services. These departments are not provided access to the GIS databases for the associated municipality, and, as such, are unaware of any changes in the database that may affect their operations or assist in managing the operations they control. For example, paramedics may be unaware that a given street is closed for repairs, and be delayed in responding to a call because the paramedics en route to an accident scene tried to use the street that is closed.

Further, current routing systems perform routings based upon static speed data. They do not take into account the dynamically changing traffic situation. At best they merely report a status, and are not integrated with a GIS system for use in planning purposes. Many mapping databases report that there is an accident on a given freeway, but do not determine any time of travel on the road, segment, or interval containing the accident. Further, these routing systems are generically determined based on only one data input, namely, a road closure. These systems do not take into account other factors such as equipment status or time of travel between two given points on the roads, segments, alleys, etc. that connect these two points. These systems also do not retain data for analysis after events have occurred to root out systemic problems or determine corrective actions.

The large GIS databases, even if combined with other services and data, do not have the capability to provide information to commercial and consumer markets for use in managing fleet and personal travel itineraries. Such access would provide lower fuel costs and shorter travel times, as well as better management of fleet resources.

Even if the GIS databases were combined with existing services, the number of sensors and other data sources used to augment the GIS databases do not provide proper coverage to accurately predict or determine the optimal route between two points. Even in large metropolitan areas, the percentage of roads monitored by sensors is a small fraction of the number of roads that are in service, and, as such, the data available cannot provide an accurate model of real-time traffic conditions.

Emergency management operations, typically deployed during times of evacuation, do not utilize GIS databases. Some typical reasons for evacuation, including hurricanes threatening an area, wildfires, biological, nuclear, or chemical attacks, have fixed evacuation routes, and use the same evacuation routes for all different types of emergencies. Emergency operations centers typically do not have access to the tools necessary to dynamically identify the optimal routes for evacuation. As such, there are typically signs marking predetermined roadways as "evacuation routes" rather than dynamic determinations of what route may be best at any given time or for any given emergency. More complex incidents, such as wildfires and terrorist attacks, are more dynamic in nature, and the optimal evacuation plan cannot be predicted due to uncertainties in how the emergency will unfold prior to the actual event.

From the foregoing, it can be seen, then, that there is a need in the art for interconnectivity between the GIS databases and other sources of data. It can also be seen, then, that there is a need in the art to provide access to the combined GIS database for management and operations beyond the municipal schema for use by emergency personnel to determine evacuation routes. It can also be seen that there is a need in the art for a method of dynamically determining evacuation routes based on the imminent or ongoing emergency.

SUMMARY OF THE INVENTION

To minimize the limitations in the prior art, and to minimize other limitations that will become apparent upon reading and understanding the present specification, the present invention describes a GIS-based system that determines evacuation routes for specific areas requiring evacuation. Evacuation and safe areas are determined, and evacuation routes plotted, based on emergency-specific information as well as road flow and estimated time of travel for each section of road between the evacuation area and safe area. Routes, evacuation areas, and safe areas are dynamically calculated and recalculated based on additional data, either real-time, historical, or other data added to the system, to compute optimal initial routes and redirect evacuees if changes in the emergency situation occur.

A method in accordance with the present invention comprises determining routes for an emergency situation using a geographical information systems (GIS) database that represents a geographical area. In one embodiment of the present invention, the GIS database contains at least four data layers: roads, evacuation areas, population density, and safe destinations. The road layer describes the road network. It comprises a collection of road segments and their connectivity. The road segments are attributed with length, current and future speeds. These attributes allow for calculation of segment transit times. Attributes at the intersections allow for calculation of transit delays due to traffic lights and turning. The evacuation areas data layer describes the points and areas to be evacuated. The intersection of this data layer with the population density data layer determines the evacuation demand. The evacuation demand is the spatial distribution of people to be evacuated. The evacuation demand is intersected with the road network to create a source of evacuation flow. The safe destination data layer consist of points and areas that accept evacuation flow. A point destination could be an emergency shelter, hospital, or decontamination center. A destination area can represent the edge of the area to be evacuated. The safe destination data layer is intersected with the road data layer to determine what points of the road network can absorb flow. Evacuation routes are determined by maximizing the traffic flow between the evacuation area and the safe area, and minimizing the flow's transit time.

BRIEF DESCRIPTION OF THE DRAWINGS

Referring now to the drawings in which like reference numbers represent corresponding parts throughout:

FIG. 1D illustrates a flow diagram of an exemplary data fusion converter process that merges information multiple sources into a coherent picture for use by the present invention;

DETAILED DESCRIPTION OF THE PREFERRED EMBODIMENTS

In the following description, reference is made to the accompanying drawings which form a part hereof, and which is shown, by way of illustration, several embodiments of the present invention. It is to be understood that other embodiments may be utilized and structural changes may be made without departing from the scope of the present invention.

Overview

Most state and local agencies use GIS to manage, plan, and record geographical information in their respective jurisdictions. However, these agencies use GIS solely as a mapping tool, rather than using the data in a dynamic manner for routing of vehicles.

Emergency vehicles, commuters, and business fleet management services all can use GIS databases in a dynamic fashion to optimize routes for certain vehicles or for certain situations. For example, and not by way of limitation, if an emergency situation arises, such as the breakout of a large-scale fire, the GIS database can be used to determine the best evacuation routes for the areas where the fire is. Further, the databases can be combined with other information such as wind direction, fire direction and speed of travel, etc. to dynamically determine the best evacuation direction as well as the best routes to take for a given emergency. As roads become placed into service or modified for the evacuation, the system of the present invention can re-route traffic to other roads as these new roads become more time efficient than the original routes.

Depending on the evacuation needed, the system of the present invention allows for different parameters to be entered and taken into account, as well as which area needs to be evacuated. For example, and not by way of limitation, if the emergency is a fire, the system of the present invention needs information on which way the fire is traveling, and which way the firefighters are going to be fighting the fire, so that evacuation routes can be properly determined to evacuate the area as soon as possible while not interfering with the firefighting effort.

Similarly, for a chemical or biological attack, the system of the present invention needs information on which way the wind is blowing so that a proper evacuation area and safe area may be determined, and for a hurricane evacuation, the system of the present invention needs information on the most likely landfall area, whether it is more likely that the hurricane will travel north, south, east, or west of that point given historical weather patterns, and which direction will the hurricane travel once it makes landfall, so that proper safe areas can be established. These additional disaster-specific data points are placed into the system of the present invention to assist emergency management operations in evacuating people from certain areas in the most time-efficient manner, as well as making it easier for emergency response personnel to contend with the emergency at hand.

Environment

Figure 1A:
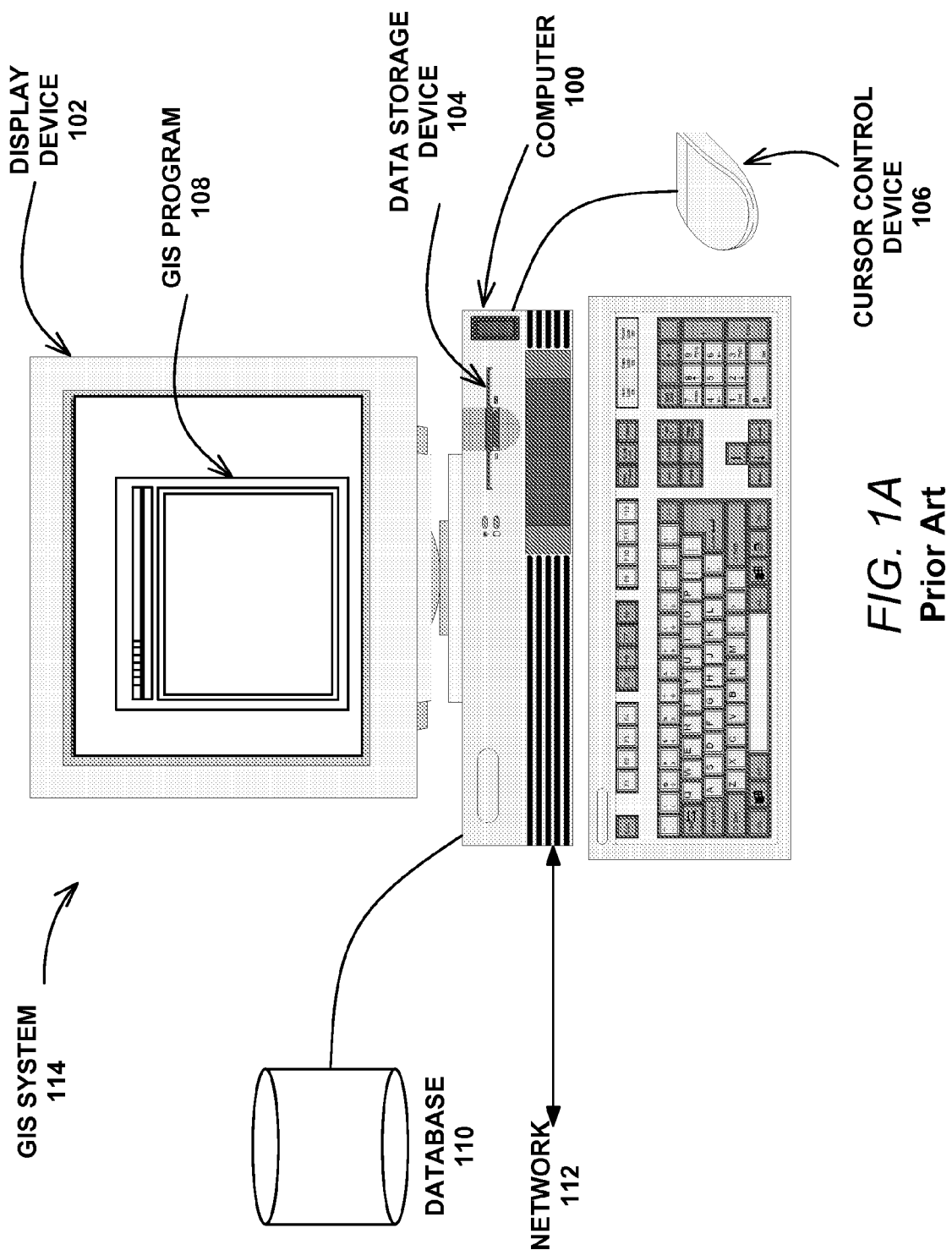
FIG. 1A is an exemplary hardware and software environment used to implement one or more embodiments of the invention.

FIG. 1A is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented Geographical Information System (GIS) program 108, wherein the GIS program 108 is represented by a window displayed on the display device 102. In one or more embodiments of the invention, the GIS program 108 uses ARCINFO and NETWORK ANALYZER, available from ESRI, Inc. Other Commercial Off-the-Shelf (COTS) software packages can be used if desired without departing from the scope of the present invention.

Generally, the GIS program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. Further, the GIS program 108 may utilize a database 110 such as a spatial database.

Computer 100 may also be connected to other computers 100 (e.g., a client or server computer) via network 112 comprising the Internet, LANs (local area network), WANs (wide area network), or the like. Further, database 110 may be integrated within computer 100 or may be located across network 112 on another computer 100 or accessible device.

Those skilled in the art will recognize that the exemplary system illustrated in FIG. 1A is not intended to limit the present invention. Indeed, those skilled in the art will recognize that other alternative systems may be used without departing from the scope of the present invention. Accordingly, FIG. 1A illustrates an integrated AGTM system 114 that combines the traditional capabilities of GIS tools with other data entries and data properties for use in situational ground traffic routing.

System Overview

Figure 1B:
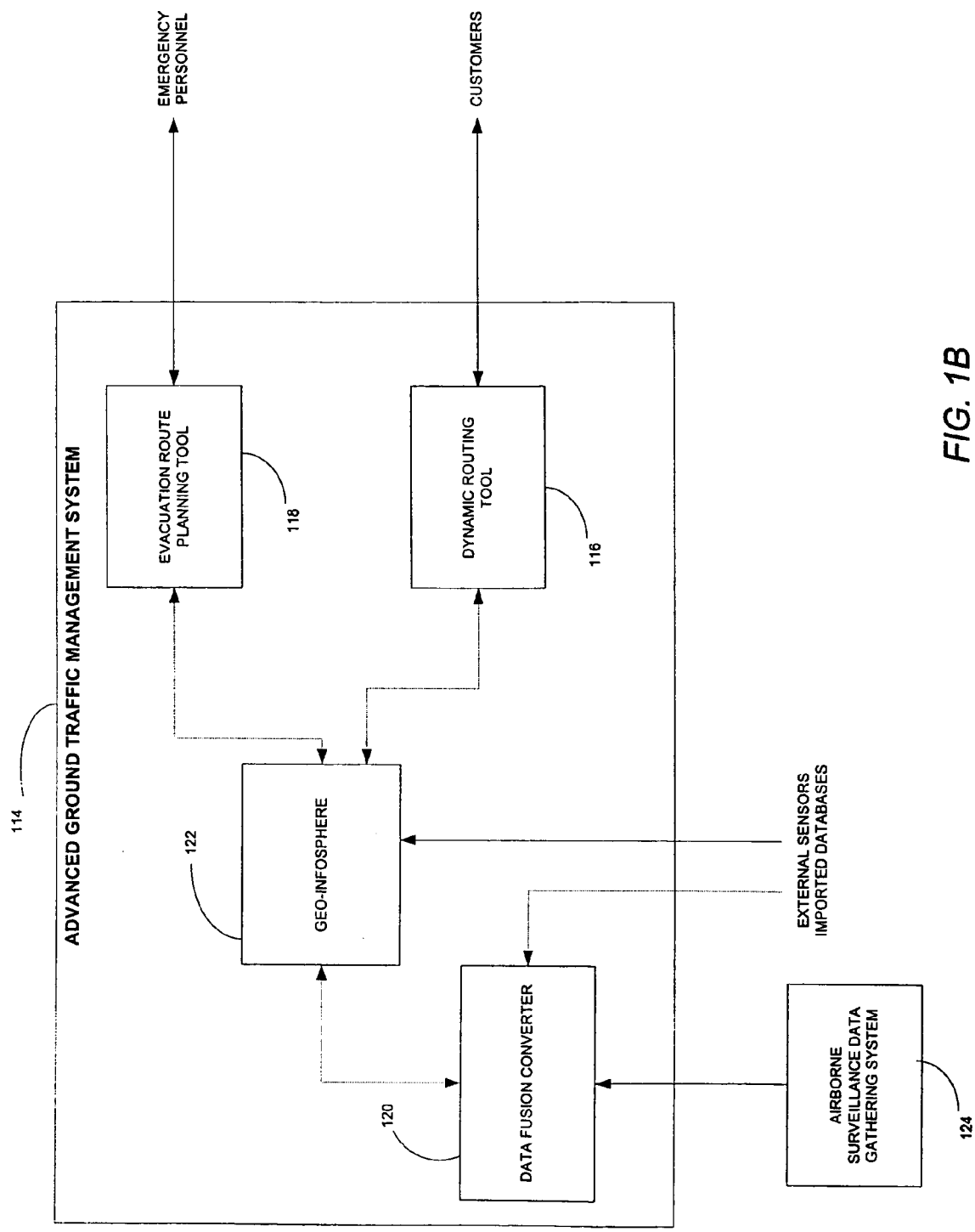
FIG. 1B provides an overview of the advanced ground traffic management system of the present invention.

FIG. 1B provides a functional diagram of a non-limiting exemplary the advanced ground traffic management system of the present invention. The exemplary AGTM system 114 includes a dynamic routing tool 116, evacuation route planning tool 118, data fusion converter 120, and a geo-infosphere 122. System 114 accepts input from other information sources, such as but not limited to traffic signals, weather, cameras, road network, external sensors, data from an airborne surveillance data gathering system 124, imported databases, etc. that may be provided in a different format than used by the present invention. These datasets are input to the data fusion converter 120 and stored by the geo-infosphere 122. The AGTM system 114 also provides links to and from customers and emergency personnel.

The AGTM system 114 of the present invention allows for the collection and management of various data types into a GIS database, such that all of the data can be used to determine optimal traffic flow for a given geographical area at a given time under current and predicted circumstances. The basic GIS data is augmented with various user inputs, or replaced on a temporary or permanent basis with new data supplied by external sources. Such sources may be providing data in different formats to the geo-infosphere 122; as such, the data fusion converter 120 converts the data received into a format that can be stored in the geo-infosphere 122, and updates data within the geo-infosphere 122 as needed. Such real-time or near-real time data can then be utilized by the dynamic routing tool 116 and evacuation route planning tool 118, to optimally compute traffic routes. Data from the airborne surveillance data gathering system 124 can optionally be added to the geo-infosphere 122 via the data fusion converter 120 if such data is available.

In one embodiment of the present invention, such routes may be computed by the AGTM system 114 in response to a request by customers, either via a wireless request using a cellular telephone system or equivalent communications system, e.g., personal communications system (PCS), etc., or a wired system, e.g., telephone system request via internet or other telephone equipment.

In one aspect of the invention, other links that can access the AGTM system 114 may be dedicated to emergency personnel for priority access to the AGTM system 114. Emergency personnel may be determining routes for evacuation, or the best route to respond to an impending or ongoing emergency, and, as such, may need priority handling by the AGTM system 114. These access points, again, can be of a hard-wired or wireless nature.

Within the AGTM system 114, data is converted by data fusion converter 120 as required and stored in the geo-infosphere 122. This data is selectively transferred to and from evacuation route planning tool 118 and dynamic routing tool 116 so that tools 116 and 118 can calculate optimal routes for given situations. Additional data from airborne surveillance data gathering system 124 can optionally be added to the geo-infosphere 122 and converted by the data fusion converter 120 if such data is available.

As routes are calculated or re-calculated by tools 116 and 118, the routing information is passed from the geo-infosphere 122 to customers and emergency personnel. Billing and archival information related to the calculation of the route are maintained. For example, and not by way of limitation, geo-infosphere 122 may keep track of specific customer routes for retrieval for that given customer, or may use those determined routes for other customers within a given time period or if no new data has been stored in the database.

Airborne Surveillance Inputs

Figure 1C:
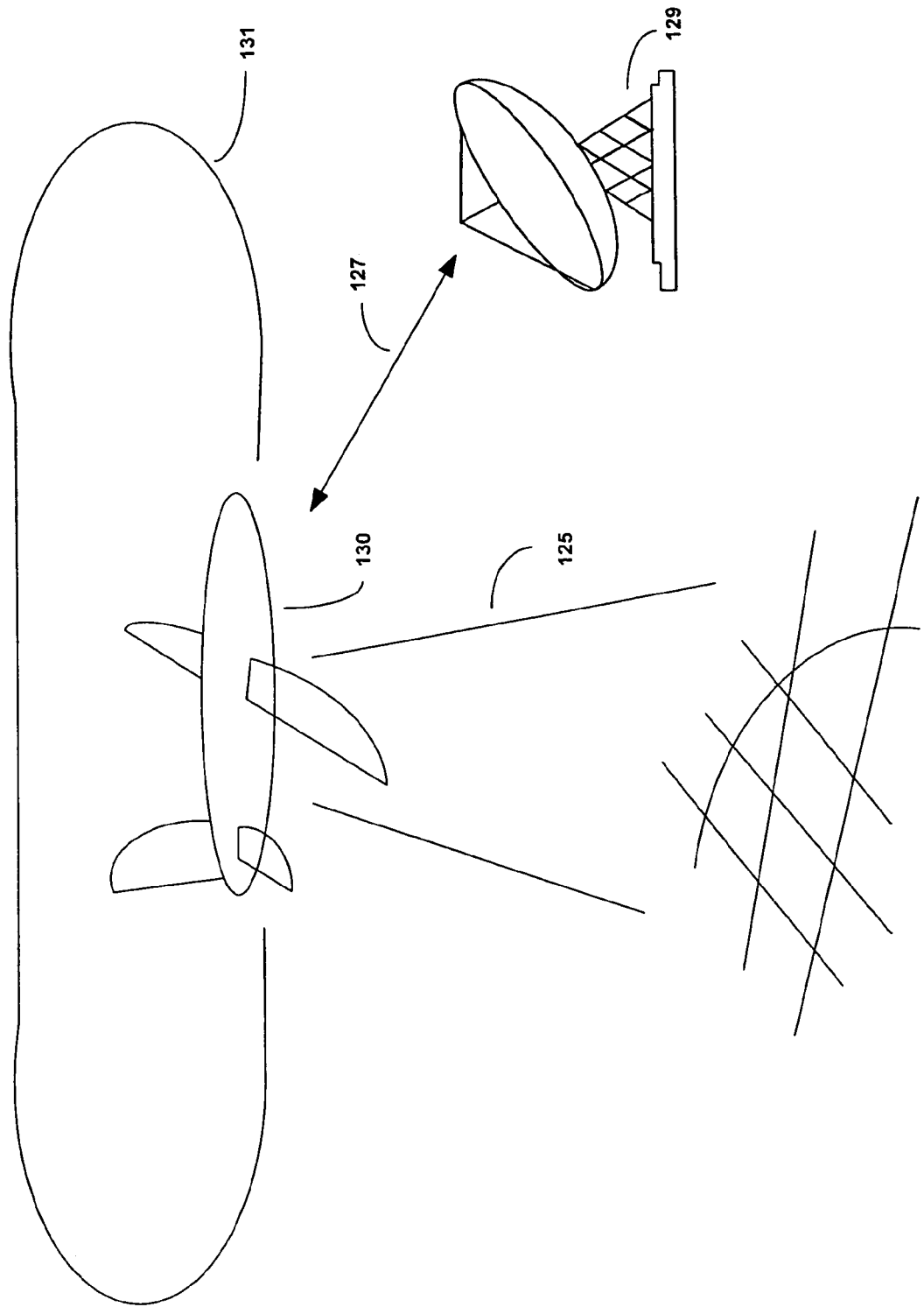
FIG. 1C illustrates a concept of operations for an airborne surveillance data gathering system that provides a data source for the present invention.

FIG. 1C illustrates an airborne surveillance data gathering system 124 in accordance with the present invention.

The aircraft data are derived from an aircraft that provides photographic or radiometric data to the AGTM system 114. Aircraft 130 is typically a High Altitude Long Endurance (HALE) aircraft, which is usually unmanned, but can be a manned aircraft if desired. Aircraft 130 uses photographic or radiometric techniques, e.g., millimeter wave passive phased array technology, radar, photographic data, etc., to acquire data 125 from a given geographic area. This data is then relayed by airborne surveillance 130 via a downlink 127 to a ground control station 129, where the data can be processed or relayed to the AGTM system 114.

Aircraft 130 can fly in a specified flight path 131, or, can fly over a specific geographic area. Further, more than one aircraft 130 can be flown in a similar or different flight path 131 to provide desired data 125 coverage of a given geographic area. Changes in the flight paths 131 can be made based on traffic conditions, emergency situations, aircraft 130 equipment being out of service for repairs, or other situations as desired.

Data 125 can be acquired by using passive millimeter wave radiometric imaging cameras. Such cameras provide capabilities to electronically record traffic patterns by sensing different energy emissions from vehicles versus a static background. Passive millimeter wave camera equipment can provide a resolution of ten feet with a fifty foot aperture, which is possible using a sparse phased array detector scheme. Such data can be acquired by HALE aircraft 130, since HALE aircraft 130 typically has a large wingspan for deployment of the passive array.

HALE aircraft 130 can be flown above the typical altitudes of commercial aircraft, and thus would not interfere with operations of airports in metropolitan areas. Further, even if HALE aircraft 130 equipment were flying at commercial aircraft cruising altitudes, commercial aircraft are typically landing or taking off near metropolitan areas, and thus would not typically be at cruising altitudes near metropolitan areas.

Typically, aircraft 130 would be flown in a racetrack or approximately oval orbit 131 over the area of interest. To maintain the real-time ore near-real-time data acquisition for AGTM system 114, the aircraft 130 must reacquire data from the same geographical area on a periodic basis. This requires that each aircraft 130 overfly the same area every period, or multiple aircraft 130 fly in a pattern, with one aircraft 130 trailing the other, such that the trailing aircraft 130 acquires the data later in time and sends the update to ground control 129.

Ground control 129 not only receives the data from aircraft 130 via communications link 127, ground control 129 also can control the unmanned airborne surveillance 130 units via uplinked commands to aircraft 130. The ground control 129 collects, collates, and processes images from the aircraft 124 to create a near-real-time picture of traffic density and speeds on the various roadways in a geographic region. Such data can be forwarded to system 114 for use by data fusion converter 120 as described below.

The ground control 129 typically operates on Ku or Ka band communication links 127, such that large imagery files can be transferred at high speeds. The ground control 129 correlates collected images with digital street maps to process the imagery data 125, and can focus on roadways of interest if desired. Target recognition software can be used to identify specific vehicles on the roadway, as well as providing markers to align imagery data 125 from various different aircraft 130 units. Ground control 129 can then use conventional cellular or other telephone networks, or have a dedicated network, to transmit the processed data to users or the AGTM system 114 as desired.

Data Fusion

The data fusion converter 120 integrates traffic data derived from diverse sources into a single format for storage in the geo-infosphere 122. Further, data fusion converter 120 processes the various traffic data to determine real-time speeds on the various roads within a geographic region.

Traffic flow information is derived from multiple sensor and human input data sources. The data fusion converter 120 processes the input data from the various inputs into a format that is compatible with and stored in the geo-infosphere 122 database, and then performs calculations to associate and correlate the data from the multiple data sources with the traffic data flow and traffic volume information to derive real-time road impedances for the various roads in a geographic region. The road impedances, e.g., time of travel, speed limit, etc., are used to determine the fastest route between two points within the geographic region. Previous systems typically use only one source of data, or use static speed limits to determine the time of travel between two points. The present invention uses multiple data sources along with real-time updates to these sources to accurately model the transportation system in a given region.

Individual inputs to the data fusion converter 120 include data from airborne surveillance data gathering system 124, data from inductive loop or other external roadway sensors, traffic camera data, localized weather data, traffic signal data, reports that are entered by police or other government personnel, data from GPS-equipped vehicles, historical statistics, etc.

Data Fusion Converter Inputs

FIG. 1D illustrates the flow diagram of data fusion converter used in conjunction with the present invention.

The data fusion converter 120 comprises data formatter engine 126 and impedance calculation engine 128. The data fusion converter 120 receives data input from various sources, e.g., airborne surveillance, in-ground sensors, camera data, vehicle data, traffic signals, call-in data, historical data, etc., and formats this data into a consistent format that can be stored in the geo-infosphere 122.

This data may have specific geolocation information associated with it, e.g., the sensor that is located at a specific spot on a given freeway has a known geolocation, and, as such, when data arrives from specific sources, the geolocation of that source does not have to be determined by data fusion converter 120. However, other data may arrive at data fusion converter 120 that does not have a known geolocation associated with that data source, or has a variable geolocation associated with that data source. For example, and not by way of limitation, call-in data may be given with a street address that needs to be converted to longitude and latitude coordinates, or airborne surveillance data may arrive from a source that is circling in a known path, but the data itself is from a different geolocation than the aircraft. As such, data formatter 126 must convert the positional tags for some of the data inputs to a common format, typically longitude and latitude, such that the AGTM system 114 can use the data.

Similarly, the data may have timestamps or other time tags which are from different time bases or time measuring devices that are offset from one another. The data formatter 126 resolves the time differences prior to passing data along to impedance calculation engine 128 or geo-infosphere 122. The data formatter 126 may also be required to pre-process data to place the data in proper format for use by engine 128 or geo-infosphere 122, e.g., cluster data must be processed to determine location and speed, etc.

Once data formatter 126 performs the required processing and formatting for the input data, data formatter 126 typically passes that data along to impedance calculation engine 128. Once impedance calculation engine 128 has completed the impedance calculation for the given input data, the impedance data is stored in geo-infosphere 122.

Alternatively, some data from data formatter 126 may be entered directly into geo-infosphere 122 without an impedance calculation being entered. For example, and not by way of limitation, historical data may be input to data formatter 126 which does not affect the current impedance of the roadway system in a given location, and, as such, does not need to be routed through impedance calculation engine 128, and can be routed directly to the geo-infosphere 122.

The impedance calculation engine 128 uses the data from data formatter 126 to determine the impedance on a given road. Impedance is assigned to each roadway to provide the AGTM system 114 a way to determine which road to use between two points. A roadway that has several lanes of traffic typically has a lower impedance than a single lane road, and, thus, would typically be desirable when selecting a route between two points connected by these two roads. However, if there is an accident on the larger road, the impedance of that roadway would be changed, and depending on the amount that the accident changes the impedance, the routing tools 116 and 118 may choose a different roadway. The impedance calculation engine 128, in essence, converts the input data received from the data formatter 126 and determines how that affects the traffic flow on the roadways.

Such calculations can be done in several ways. The calculations can be exponentially based, measured by other sensors and fed into the routing tools 116 and 118, based on historical data, or any combination of these or other techniques. The present invention is not limited by the method or approach to calculate of road impedances.

Other Data Fusion Functions

The data fusion converter 120 also creates and interprets cluster information, e.g., groups of vehicles traveling in the same direction, as well as tracking individual vehicle data. The cluster information is typically derived, for example, through the use of camera data, where pictures of groups of cars traveling along a certain stretch of road are taken at a known period, and the distance the cars have traveled is measured, giving an average speed for the roadway. Statistical and inferential methods, such as Bayesian networks, Dempster-Shaeffer networks, adaptive neural networks, or other statistical methods can be applied to the data to derive an average speed, or impedance, for the roadway.

Further, extrapolation techniques and feedback techniques can be used by the data fusion converter 120 to verify the accuracy of the prediction as well as to provide real-time data points. For example, and not by way of limitation, a Kalman filter can be used to predict a time of travel for a given stretch of roadway, and real-time data derived from a GPS-equipped vehicle can be used to verify and correct the predicted travel time. Other data sources, such as information derived from taxicabs, emergency personnel, trucking fleets, or other roadway users, can also be entered into the data fusion converter 120 for predictive, corrective, or computative use.

Data Fusion Converter Outputs

The data fusion converter 120 outputs consistently formatted data to the geo-infosphere 122. Further, the data fusion converter 120 outputs road impedances that have been calculated based on input data and other data in the geo-infosphere 122, via the impedance calculation engine 128

Data may be transferred to the data formatter 126 and impedance calculation engine 128 from geo-infosphere 122 as well. Such transfer may be performed to update or revise data already stored in the geo-infosphere 122, or to update or revise impedances on a real time basis. This may be done without input from outside of the data fusion converter 120, e.g., the data fusion converter 120 may be programmed to update impedances based on time of day, and the rush hour traffic has started.

Further, the data fusion converter 120 may receive inputs from emergency personnel to generate a route for use solely by emergency services to attend to an emergency, e.g., an ambulance route. These inputs may provide road impedance updates in real-time, as well as providing a better model of the traffic flow in both a macro and micro sense for a given geographic area.

Geo-Infosphere

In one embodiment of the present invention, the geo-infosphere 122 is an interactive communications system which stores traffic data from various sensors into a GIS database, requests the transformation of the sensor data into useable traffic impedances for each road segment (arc), stores and manages incident reports and road blockages, receives, cues, and stores calls from customers, handles billing, tallies customer usage, and cues and sends routing information to customers.

Geo-Infosphere Usage

AGTM system 114 typically supports different layers of data that are overlaid upon each other to create a given map. For example, and not by way of limitation, GIS generated maps may have several layers, one with the land coordinates, another with roads, another with street lights, and yet another layer with buildings. The present invention uses these layers in different formats to assist in the routing of vehicles, e.g., a basic county map is typically drawn with the land, water, and islands as separate layers within the AGTM system 114. Then the roads are drawn on a different layer, which contains arcs and nodes associated with those roads. Freeways and other major throughways can be drawn in different colors on the same layer, or can be drawn in different colors on different layers if desired. For example, and not by way of limitation, freeways can be drawn in red, while highways can be drawn in blue and local streets in black.

As road conditions change, the condition or incidents associated with the road closure is entered into the database such that the AGTM system 114 of the present invention can use that real-time information to calculate optimal routes. Incidents comprise accidents, fires, downed power lines, road closures, road construction, etc. that can be entered into the database by address, street, or by GPS latitude/longitude coordinates.

Some of these incidents may be of a temporal nature, e.g., rush hour traffic. Between certain hours, additional cars may be present on a given thoroughfare, and, as such, the speed limit which may be obtainable at off-peak hours is not attainable during rush hour. The system of the present invention can be programmed globally or individual streets can be programmed to accept variable speed numbers, either on a periodic or real-time basis, such that the system of the present invention can calculate a true optimal route.

However, some routes may also have intermittent difficulties or incidents associated with them, which need to be taken into account when determining how that specific route should be used in any given situation. For example, and not by way of limitation, if an incident occurs during a storm in which power lines have been downed across roads, the emergency response personnel and AGTM system 114 of the present invention can take this into account when selecting an evacuation route and also to determine a responding party so that the given road can be used for response personnel or for evacuees once the incident is repaired. Downed power lines would be reported by the police to the dispatcher at the emergency operations center, who would place a barrier into the geo-infosphere 122 at the appropriate location. The AGTM system 114 would then not use this road when determining a route for traffic or emergency response teams until the incident is cleared from the database. The AGTM system 114 can be designed to query the dispatcher or a centralized database manager at periodic times to determine whether or not the incident has been resolved, to ensure that incidents are promptly removed from the database and to ensure that all available roads are used in determining traffic and evacuation routes.

As new data is entered into the geo-infosphere, the AGTM system 114 calculates new traffic and/or evacuation routes. So, data entered may affect the routing of traffic and evacuees, however, it may not. The change in flow or cost associated with each data point is determined by the AGTM system 114 and calculates the evacuation route, or response route, based on the data and the Max Flow/Min Cost approach.

When new routes are created by AGTM system 114, these routes can be sent to emergency response personnel and to local radio stations and other media outlets for disbursement to the public in an emergency situation, or sent to customers via wireless or hard-wired links for updating their travel itineraries. Such new routes can be sent directly to cellular phones and Personal Data Assistant (PDA) devices, or automobile-mounted GPS units with updating capabilities (via cellular or other wireless services) that can then display the new route to such users. An alert can be used and sounded or flashed on the mobile device to notify drivers of the newly calculated route. The system can also take into account positions of vehicles receiving such new routes so that only those needing a new route receive such a route. This can be done by Mobile Identification Number/Electronic Serial Number (MIN/ESN) combined with GPS location of the MIN/ESN, or other techniques.

The GIS database stores raw traffic data from various places in a format that can be used by the dynamic routing tool 116 and evacuation route planning tool 118. The data is derived from traffic sensors embedded in roadways, other databases such as traffic report logs obtained from law enforcement, airborne surveillance sensors, camera data, radar, and other various data sources, and stores them in a format that can be used by the routing tools 116 and 118.

The geo-infosphere 122 also receives requests for data from customers and emergency personnel, and stores and cues these requests in the GIS database for entry into the routing tools 116 and 118. Further, for entities that are charged a fee for access to the GIS database and/or routing tools 116 and 118, the geo-infosphere 122 coordinates the billing charges and tallies customer usage associated with each access or service performed by the AGTM system 114.

For fleet management customers, the geo-infosphere 122 can track and store fleet assets, e.g., trucks, rail cars, etc., and determine their usage so that fleet management services can be optimized, and storage of tracking data in GIS database. For example, and not by way of limitation, Global Positioning System (GPS) receivers can be mounted on fleet assets, and the geolocation of such assets can be tracked via wireless transmission of position of these assets over a period of time. The asset can then be tracked over this period of time to see where it has been used, and for how much of the period the asset was in service. If a nationwide company has several thousand trucks that are transporting goods within the continental United States, the geo-infosphere 122 can manage the fleet such that additional trucks are placed in areas of high usage, and removed from areas of low usage, based on historical data or real-time data and placed in the GIS database.

Dynamic Routing Tool

Figure 2:
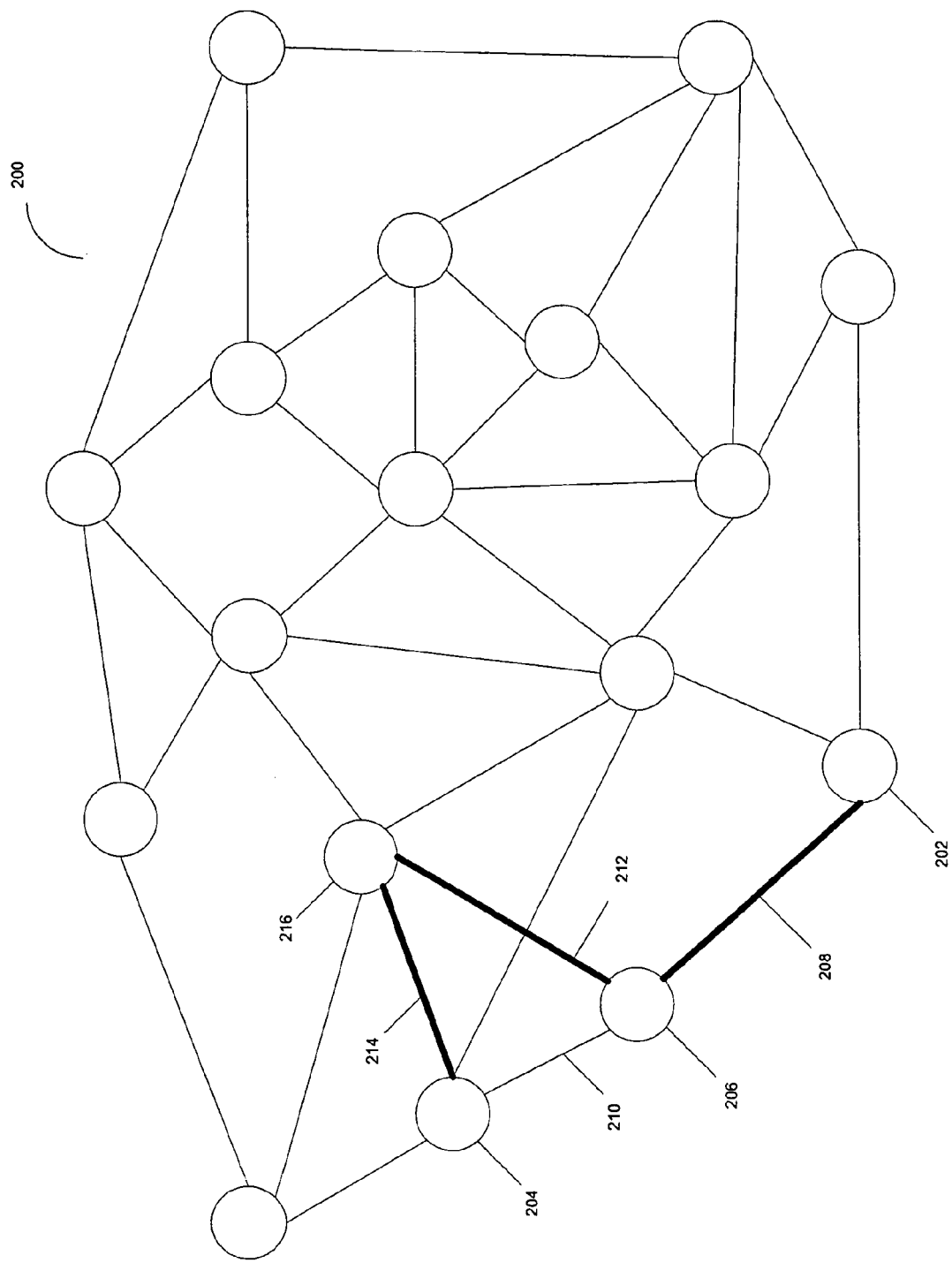
FIG. 2 illustrates a nodal approach of an embodiment of the present invention.

FIG. 2 illustrates a nodal approach of an embodiment of the present invention. Network structures are typically depicted using nodes and arcs. Arcs are connected sets of line segments, with nodes at the endpoints. In one aspect of the invention, each intersection or place represents a node, and each street is assigned an arc. In another aspect, each arc can represent more than one street or road, and each node can represent more than one intersection, e.g. the nodes can represent neighborhoods or towns, and the arcs can represent all of the roads or streets interconnecting those towns. Nodes and arcs are used to determine distances between points.

A node and arc structure defining a network 200 is illustrated by FIG. 2. In one embodiment of the present invention, the network 200 is created based on the geographic information associated with a given geographic area, and, as such, can be overlaid on a map or graphically displayed to a user of system 114 on display device 102 as a map of the area. The system 114 of the present invention, however, is not limited to any geographical area, map, or display technique; users could associate names with the nodes 202 and 204, assign numbers to the nodes 202 and 204, or use any other type of designation that is pertinent to the specific geographic area or planned use for network 200.

For example, and not by way of limitation, one user may prefer to use place names for a given node 202, whereas another user may want to use a freeway number or street address associated with node 202. Such assignments or display techniques are not limiting on the present invention, and merely serve to expand the applications of the present invention.

In one embodiment of the present invention, the dynamic routing tool 116 generates an optimum route for either shortest distance or fastest time. Qualities associated with each arc and node within network 200 influence the outcome of the optimization routine. For example, beginning at node 202, if travel to node 204 is desired, a direct route through node 206 using arcs 208 and 210 may be the best route for shortest distance using distance is a factor. However if shortest time is desired, then other attributes are considered. Arcs 212 and 214 which are associated with freeway speeds may be a better route than arc 210 which is limited to local road speeds.

The minimum cost algorithm, also known as "Min Cost," determines the fastest route between two points, by using an impedance factor assigned to each node. The impedance factor for any given arc can be the length of the road, in which case the shortest route would be calculated. The impedance factor can also be the time it takes to traverse a given stretch of road represented by an arc, which is typically based on the speed limit of that section of road associated with the arc, but can be adjusted to include other factors such as time of day, accidents, or other factors that affect the time it takes to traverse a given stretch of road. In such cases, the fastest, but not necessarily the shortest, route will be calculated. Roads with higher speed limits typically have lower impedances, and, as such, the highest speed limit route typically will have the lowest travel time between two points, but this is not always necessarily so. To determine a minimum cost path within the present invention, Dijkstra algorithms are used to compare costs associated with each arc.

FIGS. 3A-3E illustrate graphical representations of the present invention for the dynamic routing tool 116.

Figure 3A:
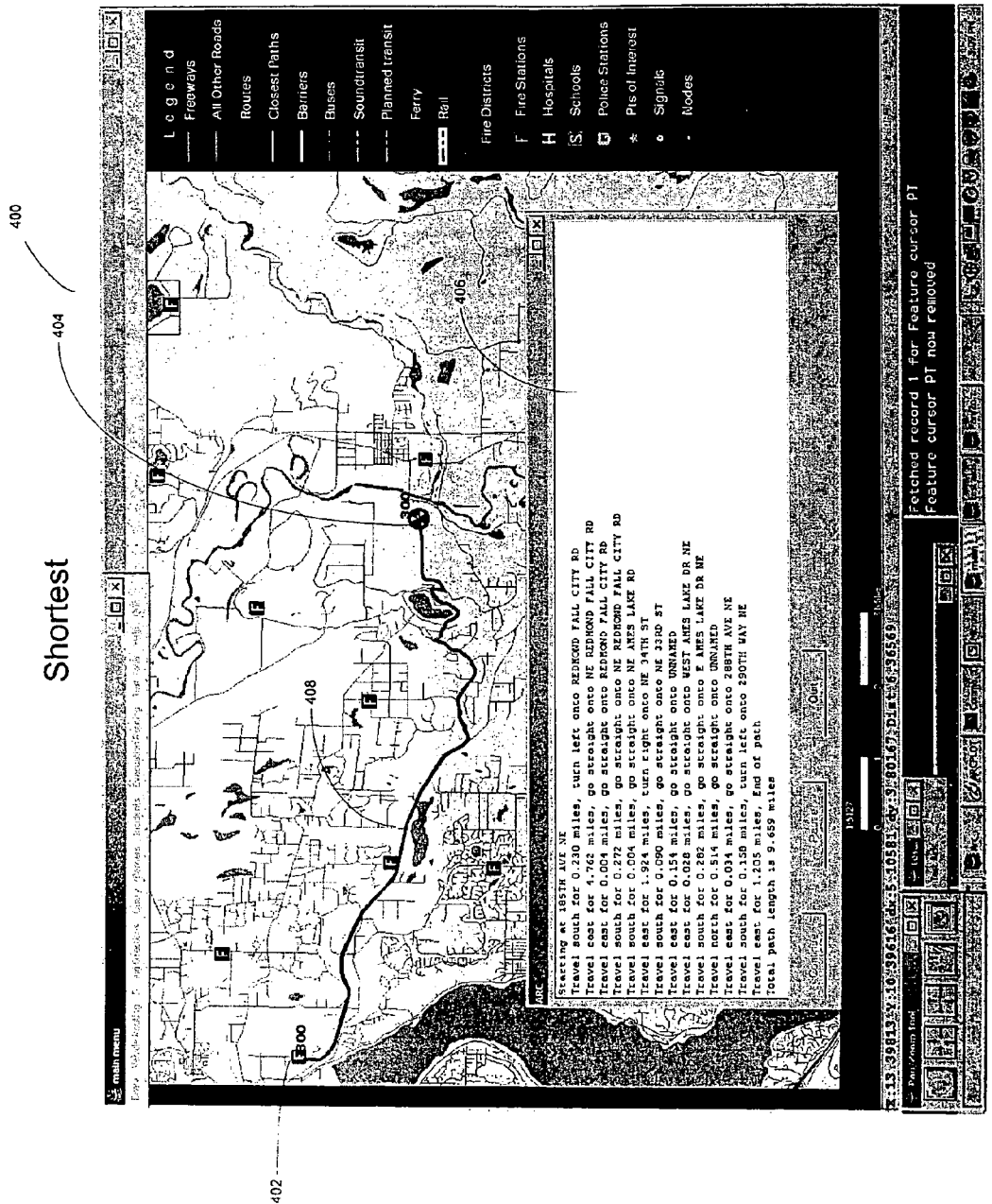
FIGS. 3A-3E illustrate exemplary graphical user interfaces of the dynamic routing tool provided with the present invention.

FIG. 3A illustrates screen 400 that is displayed on display device 102. Screen 400 shows start point 402 and end point 404, and a second screen 406 showing individual details of route 408. A user can enter start point 402 and end point 404 into the dynamic routing too 116, with a command to determine the shortest route between start point 402 and end point 408, and the dynamic routing too 116 will calculate the route 408, with window 406 showing the individual turns and directions which comprise route 408.

Figure 3B:
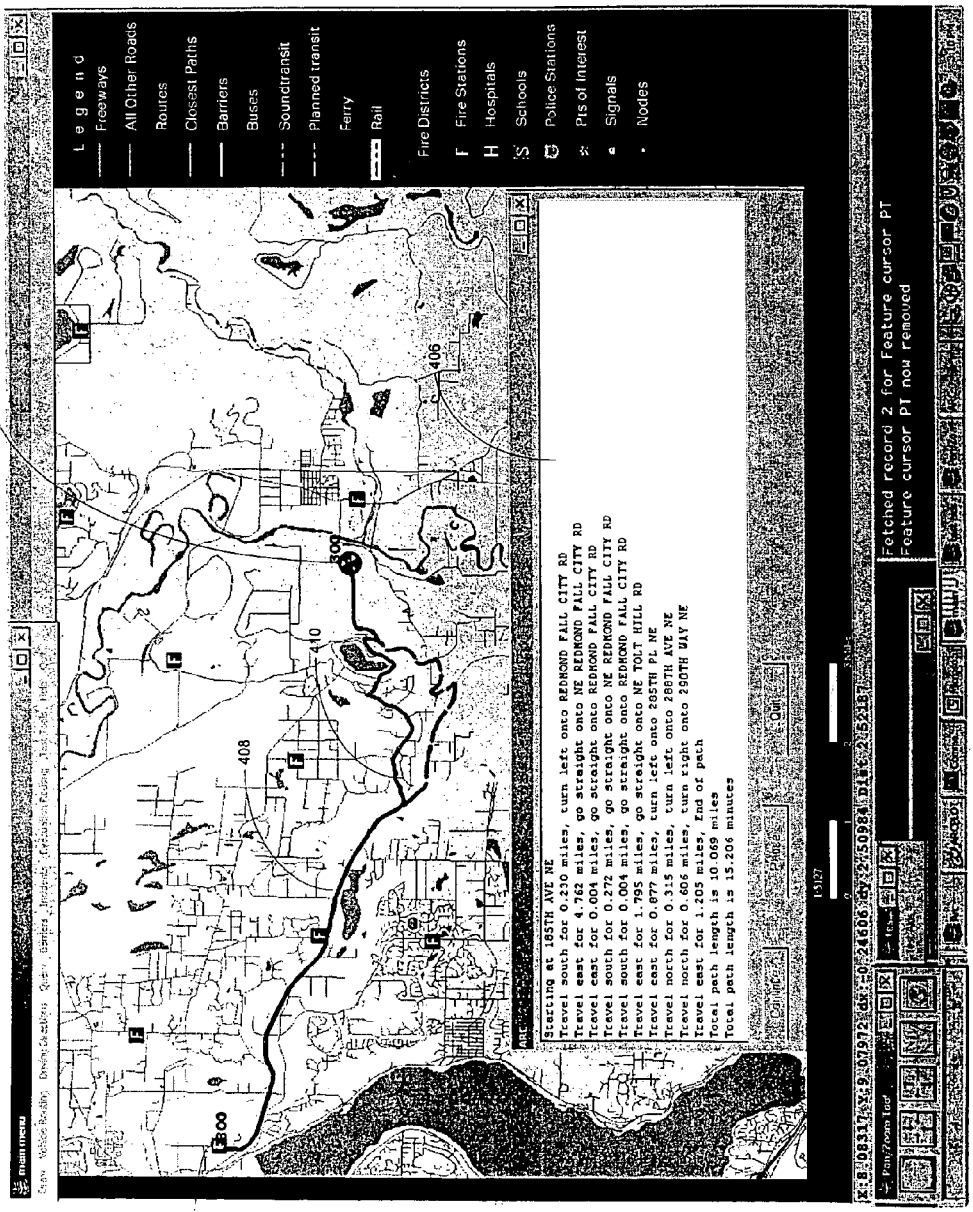

FIG. 3B illustrates that the screen 400 can illustrate not only a shortest route 408, but an alternate route 410, which is faster than route 408. Route 410 is determined by using road impedances, which are calculated using road sensors, airborne surveillance 124, and other real-time or near-real-time measurement techniques, so that users can choose the optimal route to travel between start point 402 and end point 404. Directions are again shown in window 406 for the fastest route 410.

Figure 3C:
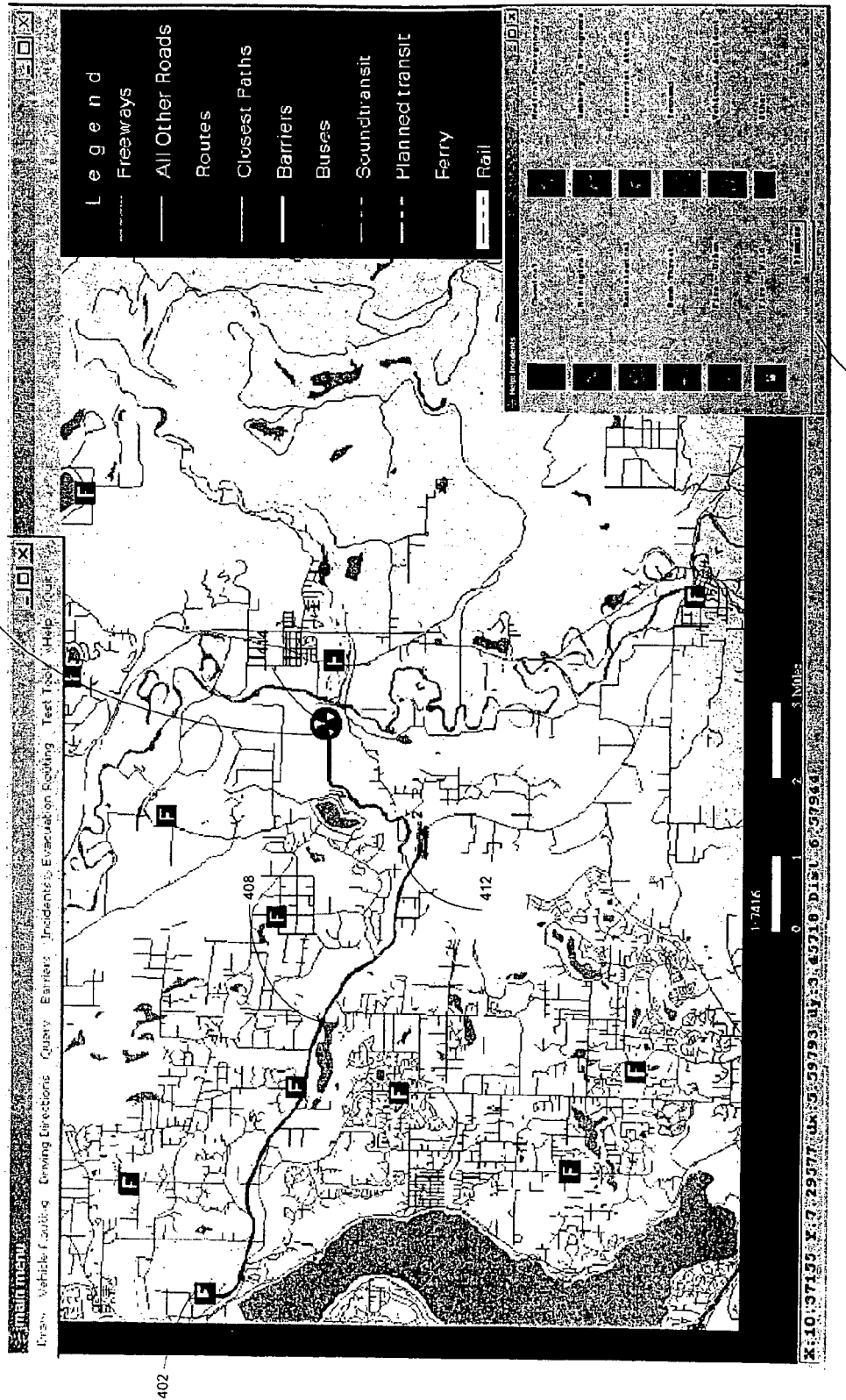

FIG. 3C illustrates that when a barrier 412, such as a road blockage, is reported or otherwise discovered to be along route 410, that barrier 412 is reported to the dynamic routing tool 116, which then recalculates route 408. The road impedances that are affected by barrier 412 are reported such that any other calculated routes may also be properly determined.

Incident 414 can be placed into the dynamic routing tool 116 using different icons for different types of barriers such as that shown on the help menu 416. Each type of incident 414 that is being responded to by emergency personnel can have a different icon to represent the type of threat or response that is required. Selection of different icons can trigger different sub programs within the dynamic routing tool 116, e.g., selection of a biological or chemical threat can trigger use of weather data to determine safe areas and evacuation areas, etc. Many different icons can be used to graphically illustrate different types of emergencies or incidents, e.g., chemical attacks, biological attacks, radiological attacks, bomb threats, urban fires, wild fires, medical emergencies, robberies, terrorist attacks, tsunami warnings, vehicle accidents, etc.

Figure 3D:
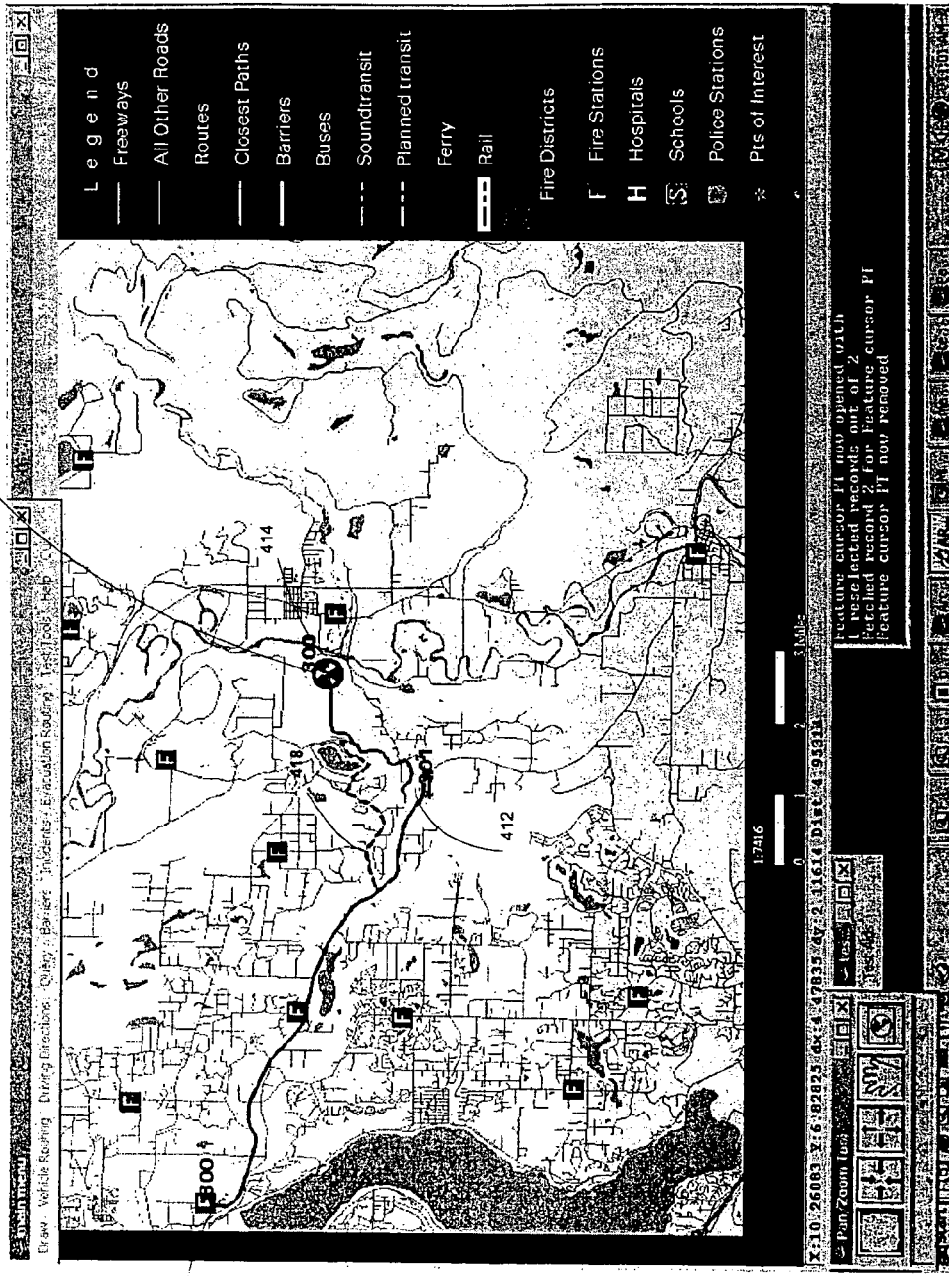

FIG. 3D illustrates the new route 418 (indicated by the dash line) determined by the dynamic routing tool 116. The route is calculated based on the current location of the emergency vehicle, the location of the barrier 412 and the location of the incident 414. The present invention uses additional inputs to assist in the route determination. For example, and not by way of limitation, emergency vehicles and other automobiles are equipped with Global Positioning System (GPS) receivers that determine the geolocation of that vehicle. Such GPS data can be used to determine speed and direction of that vehicle. When that vehicle is on a road, the true, real-time attainable speed on that road can be determined, rather than using a static posted speed limit to determine the impedance of that road. At times, the speed of the vehicle will be higher than the posted speed limit; at other times, the speed of the vehicle will be lower. This data can be placed into the database and routes can be determined based on the actual speeds attainable on the roadways rather than posted speed limits. Such data will change the impedance of a given road, which will allow the dynamic routing tool 116 of the present invention to calculate optimal routes given real-time data. Historical data, airborne collected data, data from GPS or other passive or active sensors can also be used to more accurately model the roadways.

Figure 3E:
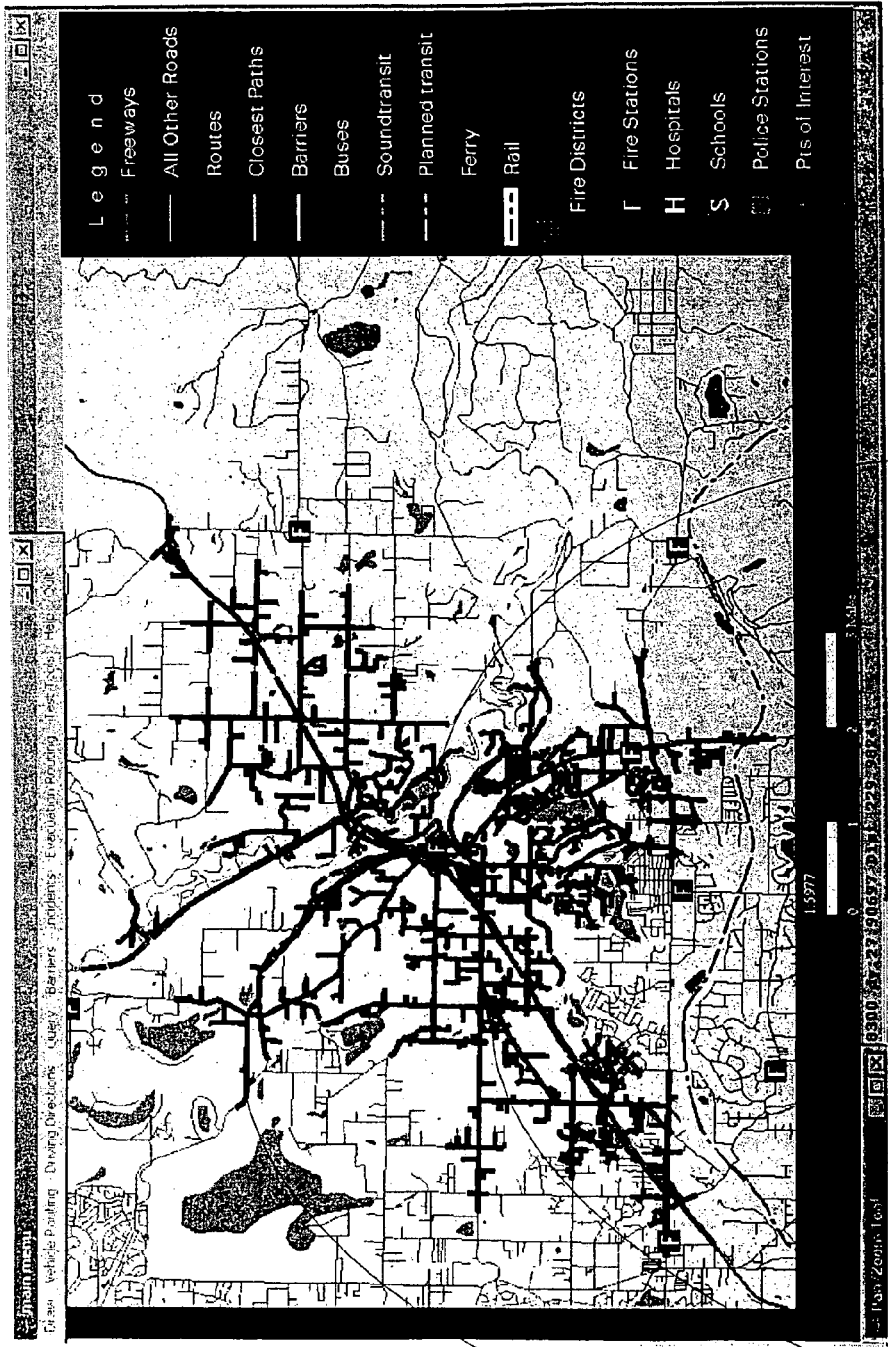

Another embodiment of the present invention is in determining the maximum coverage for a fixed location as illustrated in FIG. 3E. For example, and not by way of limitation, in screen 420 one of the nodes may be a fire station 426. The dynamic routing tool 116 of the present invention may be queried by a user to determine all points within the area that are within a given time or distance from the fire station 426. In this example two possible solutions are displayed. The broad lines 422 emanating from the fire station 426 represent an area that can be serviced within 5 minutes; the dotted lines 424 emanating from the fire station 426 represent an area that can be serviced within 3 minutes. This information can be used to determine approximate response times for the fire station 426, and can assist emergency management personnel in responding to a given emergency.

Evacuation Route Planning Tool

In one embodiment of the present invention, the evacuation route planning tool 118 determines optimum routes between evacuation areas containing multiple nodes and safe areas which also are made up of multiple nodes.

FIGS. 4A-4D illustrate graphical representations of the present invention for the evacuation route planning tool 118.

Figure 4A:
FIGS. 4A-4D illustrate exemplary graphical scenarios of the evacuation route planning tool provided with the present invention.
Figure 4B:
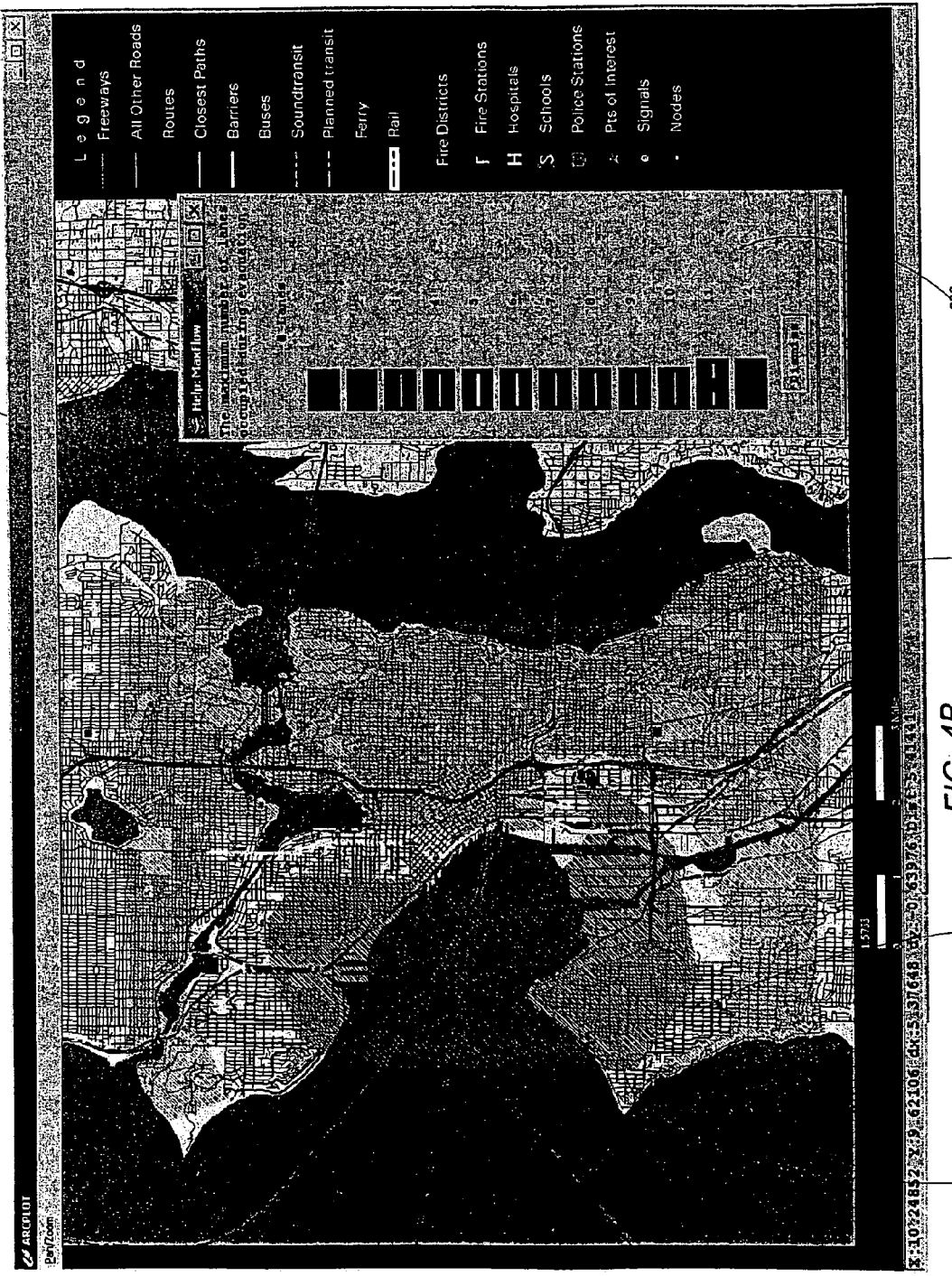

For example, FIG. 4A presents a scenario in which a dirty bomb has been activated in area 600. Based on size of the explosive and the wind speed and direction, a risk area 602 and a safe area 604 are identified by the operator. The evacuation route planning tool 118 then determines the optimum routes 606 and the number of lanes available during the routes for evacuating from the risk area to the safe area. This is illustrated in FIG. 4B. A help file 608 provides a color coding for the number of lanes available for a given segment.

Figure 4C:
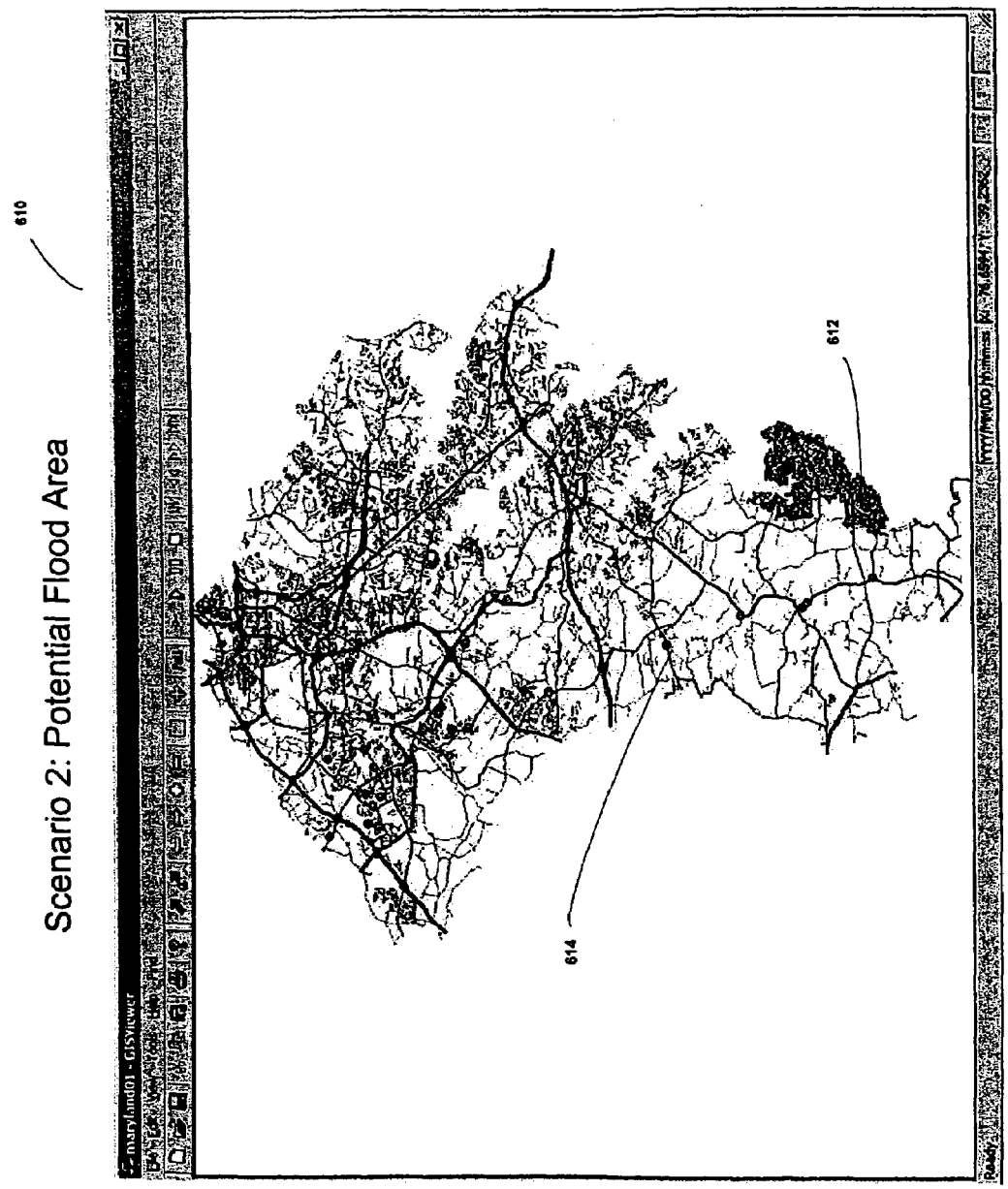
Figure 4D:
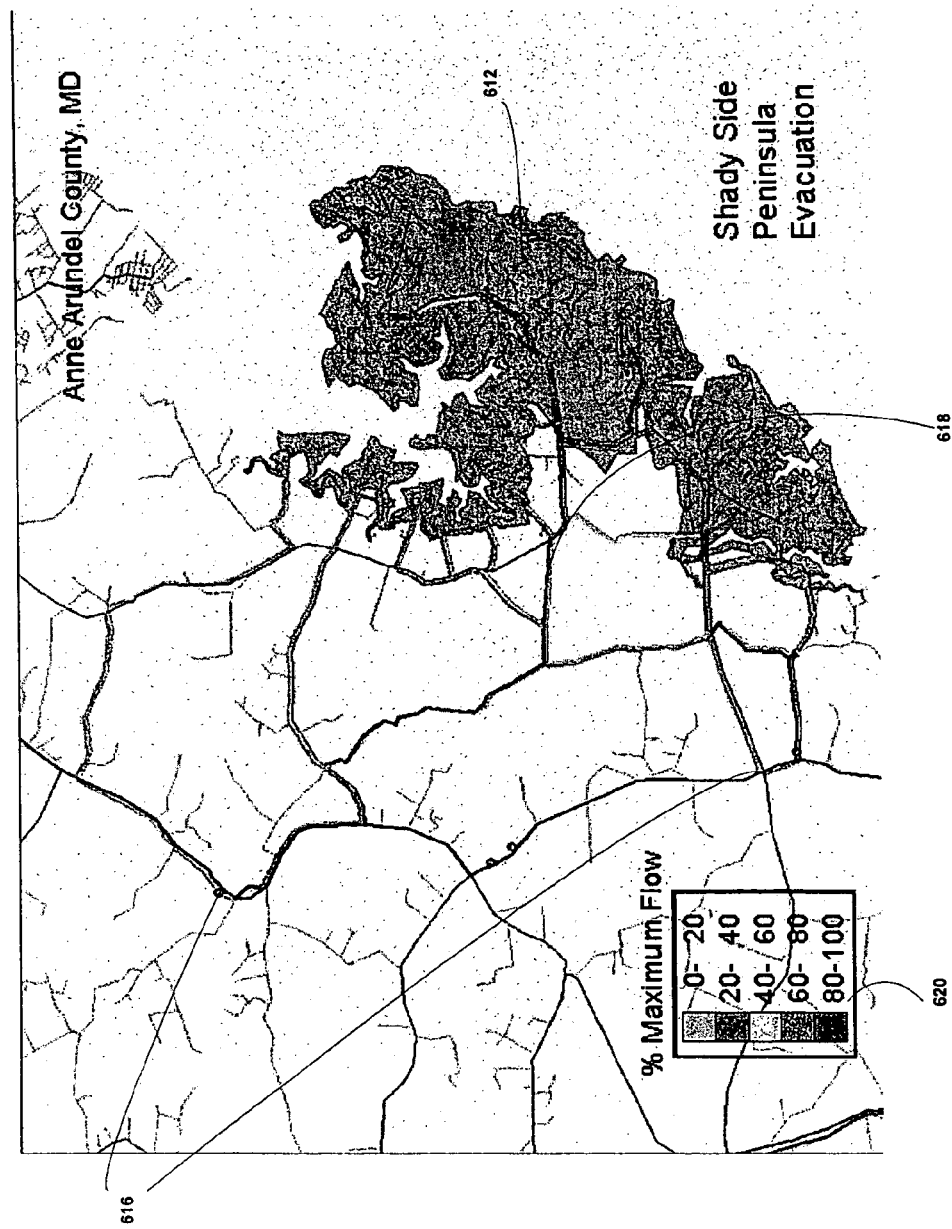

In the second scenario, the area 610 defines a potential flood area 612 as shown in FIG. 4C. Potential schools that can be used as safe havens for flood victims are represented by circles 614. The amount of time allowed for evacuation and the number of vehicles residing in the flooded area is selected by the user. The evacuation route planning tool 118 then calculates which safe areas 616 are achievable and the optimum routes 618 from the flooded area 612 as illustrated in FIG. 4D. A color coded legend 620 is provided indicating how fully occupied the road segment is during the evacuation.

Figure 5:
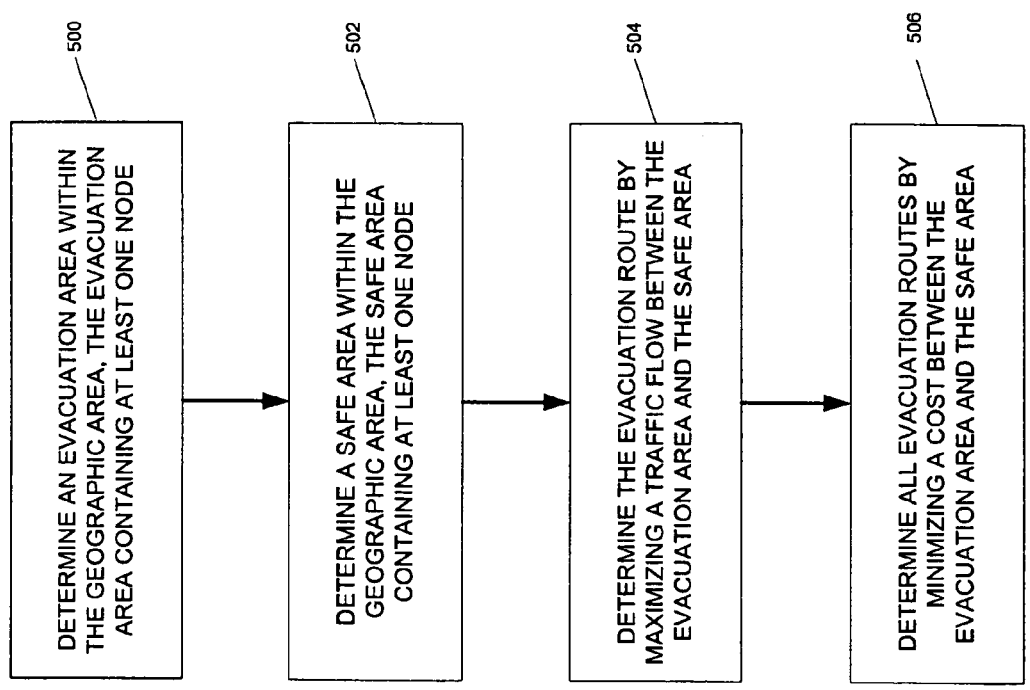
FIG. 5 illustrates a flow diagram of an exemplary process performed by the evacuation route planning tool.

FIG. 5 illustrates a non-limiting, exemplary process performed by the evacuation route planning tool 118. At box 500 an evacuation area within the geographic area is identified. An evacuation area contains at least one node. Examples of events resulting in evacuation include large-scale urban fires, wildfires, weapons of mass destruction (chemical clouds, biological, nuclear), tsunamis, hurricanes, etc. At box 502 a safe area within a geographic area is determined. A safe area consists of an area outside the evacuated area. A safe area contains at least one node.

At box 506 the maximum amount of traffic flow between the evacuation area and the safe area is evaluated. The maximum flow algorithm, also known as "Max Flow," developed by Ford & Fulkerson is used to determine the maximum amount of traffic flow that can move from one area to another, or evacuate any given area. Flow is typically determined by the number of lanes of traffic, however, as seen above, can be modified based on other events, such as accidents, road closures, or road construction. The number of lanes each road can accommodate is assigned to each arc. In the network 200, for example, arc 208 may be a freeway with three lanes of traffic in each direction, and arc 210 may be a city street with one lane of traffic in each direction. If the AGTM system 114 of the present invention is given a command to minimize the distance between node 202 and node 204 and then calculate a route to take, the route would most likely be to take arcs 208 and 210 in accordance with the Min Cost algorithm.

However, if arc 212 is a freeway with three lanes of traffic in each direction, and arc 214 is also a freeway with three lanes of traffic in each direction, and the AGTM system 114 of the present invention is given a command to maximize the flow between node 202 and node 204, the most likely result is that the AGTM system 114 would select a route that uses arc 208, arc 212, and arc 214, traveling through an additional node 216. Even though this route may be longer in terms of distance, it would allow the maximum flow between node 202 and node 204. Other data may be given to the evacuation route planning tool 118 of the present invention, such as road closures, hour of the day to determine rush hour traffic, current traffic conditions on specific arcs within network 200, fire danger, topology for use in flood evacuations, etc., which may allow the evacuation route planning tool 118 may select a different route to satisfy the conditions given. For example, and not by way of limitation, even though the maximum theoretical flow would be to take the freeway from node 202 to node 204, i.e., use arcs 208, 212, and 214, it may be during rush hour, and the freeway is at a standstill. Thus, staying on the freeway for as small amount of time as possible would increase the flow between node 202 and node 204, and thus, the AGTM system 114 of the present invention would take that situation into account when planning a route between nodes 202 and 204.

At box 508 routes from the evacuation area to the safe area are further evaluated such that the time to get to the safe zone is minimized. Road impedance is used as a factor for cost. At least one evacuation route between the evacuation area and the safe area is computed. The evacuation route dynamically computed will contain at least one arc.

In a dynamic situation, the focus on only Max Flow or Min Cost is not enough to ensure that the optimal path is selected. As such, the present invention uses a combination of Max Flow/Min Cost, and then optimizes that solution even further based on the data in the database.

Further, the present invention uses real-time data acquisition to augment the Max Flow/Min Cost algorithms to include current conditions into the Max Flow/Min Cost calculations. Further, with an emergency situation, the present invention can calculate different routes for different evacuees, because if all evacuees are directed to travel along the same roads, the flow on the selected roads may be reduced. As such, as flow on roads are determined during an emergency evacuation situation, evacuees can be redirected to use other roads to maximize the flow from a given area, rather than focusing on the flow from a given node or flow along a given arc within the system 200.

Figure 6A:
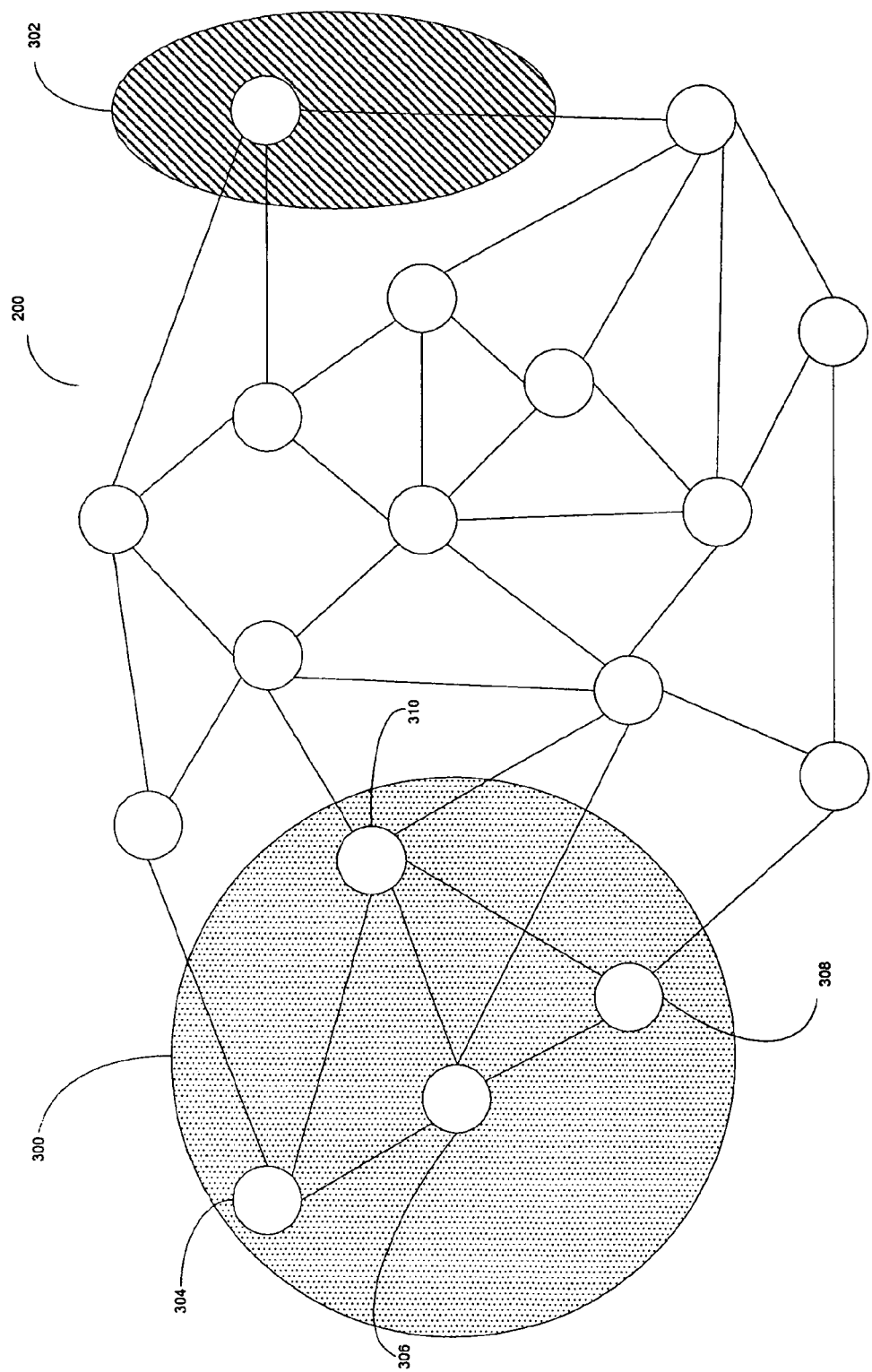
FIGS. 6A-6C illustrate a typical evacuation flow planning using the present invention.
Figure 6B:
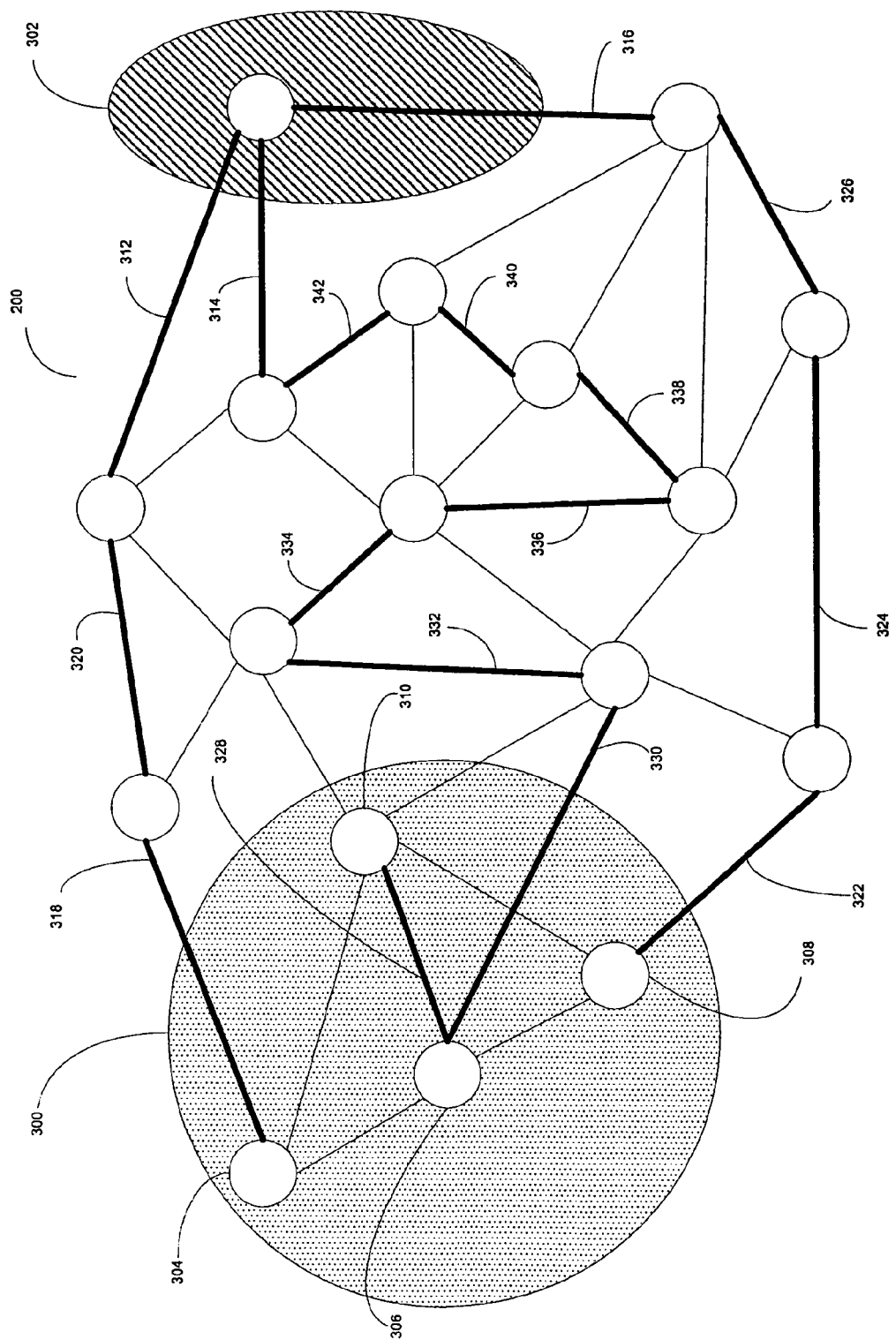
Figure 6C:
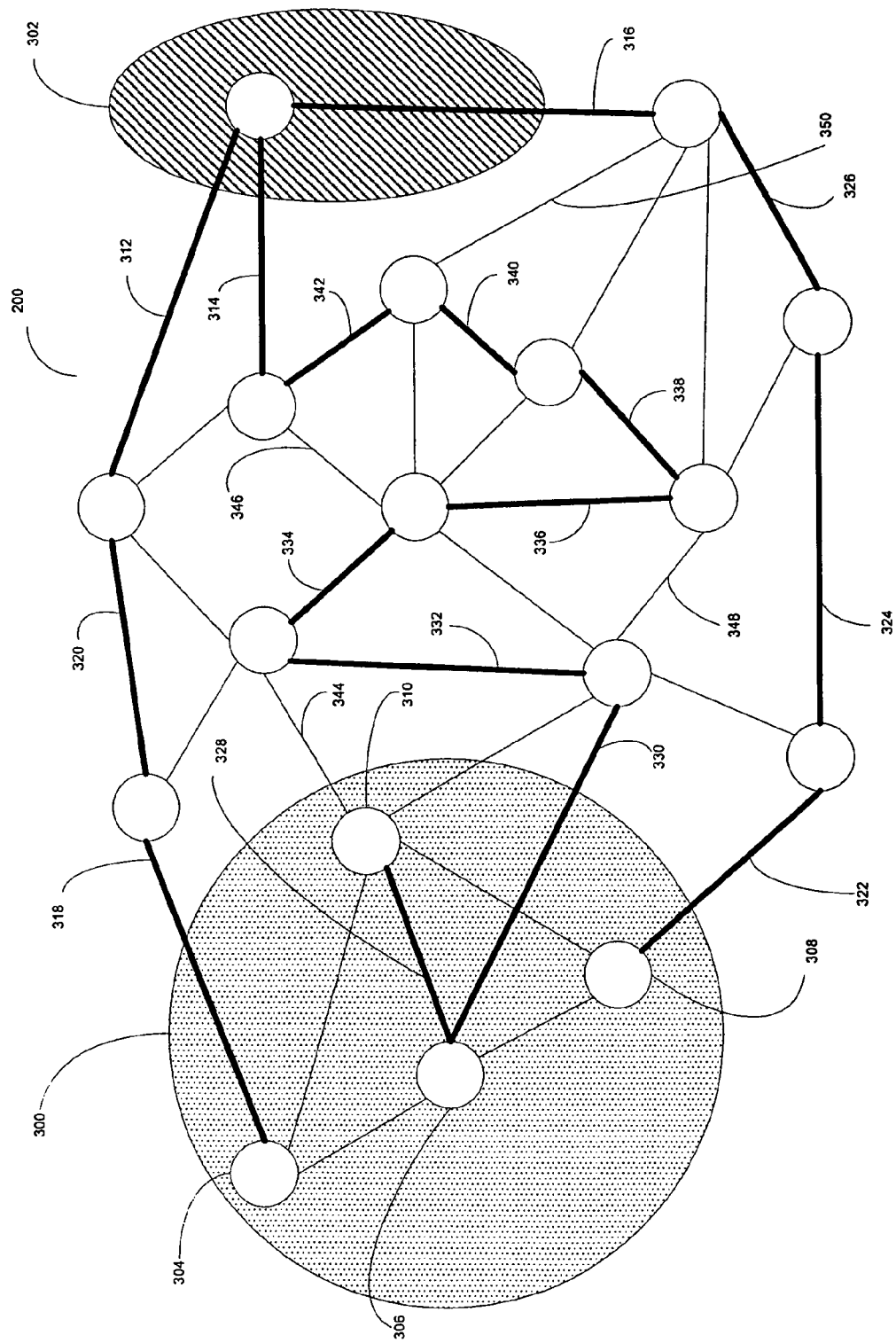

A typical evacuation flow planning using the present invention is further illustrated in FIGS. 6A-6C.

FIG. 6A illustrates network 200 that has an emergency situation where evacuation area 300 and safe area 302 have been defined by the AGTM system 114. The evacuation route planning tool 118 of the present invention now must determine the optimal evacuation routes for each of the nodes 304, 306, 308, and 310.

FIG. 6B illustrates the flow from the evacuation area to the safe area initially determined by the present invention.

Initially, the Max Flow algorithm is used to determine the maximum amount of traffic flow that can evacuate a given area. As such, once evacuation area 300 and safe area 302 are determined and overlaid upon the network 200 topology, the program 108 of the present invention determines how many lanes of traffic can flow between evacuation area 300 and safe area 302. The Max Flow algorithm determines the bottlenecks in network 200 that limit the traffic flow. Such bottlenecks are typically caused by rivers, lakes, mountains, steep terrain, railroads, limited access, or other geographical or road-specific flow restrictions. For example, and not by way of limitation, there are only three roads of flow between the evacuation area 300 and the safe area 302, represented by arcs 312, 314, and 316. Bottlenecks can occur anywhere within network 200, and are not always located at minimal points of entry to a given node.

For example, and not by way of limitation, although there may be several arcs entering and/or leaving a given node, the arcs may all represent single lane streets or roads. Another node in network 200 may only have two arcs attached to it, but those arcs may represent multi-lane freeways. Although it would appear that the node with only two arcs would be the limiting factor for flow or cost analysis in such a network 200, it may be that the node with several arcs ends up being the limiting factor, because the flow or cost associated with those arcs, even when combined, are not as efficient as the two arcs attached to the other node.

Node 304 is routed to safe area 302 by arcs 318, 320, and 312. This route is likely not only the shortest route between node 304 and safe area 302, but the one that maximizes flow and minimizes time, and, further, minimizes time in the evacuation zone 300.

Node 308, in a similar fashion, is routed to safe area 302 by a straightforward route along arcs 322, 324, 326, and 316.

Nodes 306 and 310, however, are routed very differently than nodes 304 and 308. Node 310 is first routed to node 306, which is back into the evacuation zone, along arc 328. Both nodes are then routed together along arcs 330, 332, 334, 336, 338, 340, 342, and 314 into safe zone 302. Although this may be the maximum flow and/or minimum cost between nodes 306 and 310 to safe zone 302, such a route may not take into account other factors, such as the evacuation zone 300 or the seemingly haphazard routing of traffic from nodes 306 and 310. As such, the present invention adds an additional logical step to determine a more effective evacuation route from evacuation zone 300 based on the emergency represented by evacuation zone 300 and other factors.

Such an approach, using the Max Flow algorithm initially to determine the bottlenecks and then applying the Min Cost algorithm, the present invention optimizes the routing of the flow from evacuation area 300 to safe area 302. The present invention applies these algorithms to a specialized database that has information which helps to optimize the safe evacuation in a minimum time for a given emergency, rather than merely looking at traffic flow and road impedances.

For example, and not by way of limitation, it would not be safe to have the evacuees from node 310 to travel to node 306 if the emergency is a wildfire, and node 306 was near the center of the fire, but it may be safe if node 310 is in a valley, node 306 is on higher ground, and the emergency is a flood warning. The present invention not only takes into account Max Flow and Min Cost, but also takes these additional items into account when determining a route for each node 304-310.

Further, the present invention can take into account routes that will be used by emergency response personnel, and prevent evacuees from using those roads to keep these roads free for rapid response by emergency personnel. Prevention in that regard is done by placing a block or incident on the road desired for emergency response personnel, and forcing the system of the present invention to create a route for evacuees that does not use that road.

The present invention can also be connected to traffic signals, freeway control signals, and other traffic control devices to assist in the flow along specific routes. For example, and not by way of limitation, the present invention can disable a left turn arrow, or change the timing of a traffic signal, to allow flow in a certain direction or prevent flow in another direction. The additional flow in a certain direction would assist with the flow of evacuees, whereas emergency personnel may want to reserve certain roads for use solely by emergency personnel.

The evacuation route planning tool 118 of the present invention further takes into account several factors, including population, number of expected vehicles leaving evacuation area 300, flow rates of the various roads between evacuation area 300 and safe area 302, etc., and generates routes between evacuation area 300 and safe area 302. More than one safe area 302 may be determined by program 108 and system 114, and safe area 302 may be re-determined during the emergency should the conditions of the emergency situation warrant such a re-determination. Further, safe area 302 may be determined by the emergency personnel, who have the ability to override the safe area 302 determination by program 108 or system 114.

For example, and not by way of limitation, consider a situation where a wildfire emergency is being responded to. Evacuation area 300 and safe area 302 are initially determined, whether by AGTM system 114 or by emergency personnel. However, after initial evacuation, a change in the weather occurs, and the wind shifts, blowing the wildfire emergency toward safe area 302, or a new fire breaks out, threatening the homes and shelters that have been set up in safe area 302. The program 108 of the present invention can determine a new safe area, or, alternatively, emergency personnel can assign a new safe area 302 to another part of network 200. A new evacuation area 300 would be assigned to network 200, and routes determined for evacuees to travel from new evacuation area 300 to new safe area 302.

Further, the evacuation route planning tool 118 of the present invention provides emergency personnel with other data, such as the amount of time it will take to evacuate a given evacuation area 302. The evacuation route planning tool 118 of the present invention can be given population data, estimates of the number of vehicles that will be traveling on the roads during an evacuation, as well as the network 200 cost and flow data and other factors, and an elapsed time to evacuate the area can be calculated by the evacuation route planning tool 118. Such scenarios can be useful in planning, since simulations or data points can be gathered prior to actual emergency events taking place, so that emergency personnel can determine potential problems ahead of time and take preventative measures to correct those potential problems.

FIG. 6C illustrates routes created by using the additional processing steps of the present invention.

As in FIG. 6B, node 308 evacuees will continue to take arcs 322, 324, 326, and 316 to reach safe zone 302, and node 304 evacuees will continue to take arcs 318, 320, and 312 to reach safe zone 302. However, the present invention computes new routes for evacuees from nodes 306 and 310. Rather than sending evacuees from node 310 along arc 328, the evacuation route planning tool 118 of the present invention takes additional information into account, e.g., nature of the emergency, roads used by emergency response personnel, etc., to compute a Max Flow/Min Cost solution, and routes evacuees from node 310 along arc 344 rather than along arc 328. Further, evacuees from node 310 would continue toward safe zone 302 along arcs 334, 346, and 314.

Evacuees from node 306 will still travel along arc 330, but will be re-routed by the present invention to arc 348 rather than arc 332. Node 306 evacuees will also be routed along arcs 338, 340, 342, and 314 to reach safe zone 302.

Further, the present invention can use additional inputs to assist in the route determination. For example, and not by way of limitation, emergency vehicles and other automobiles are equipped with Global Positioning System (GPS) receivers that determine the geolocation of that vehicle. Such GPS data can be used to determine speed and direction of that vehicle. When that vehicle is on a road, the true, real-time attainable speed on that road can be determined, rather than using a static posted speed limit to determine the impedance of that road. At times, the speed of the vehicle will be higher than the posted speed limit; at other times, the speed of the vehicle will be lower. This data can be placed into the database and routes can be determined based on the actual speeds attainable on the roadways rather than posted speed limits. Such data will change the impedance of a given road, which will allow the evacuation route planning tool 118 of the present invention to calculate optimal routes given real-time data. Historical data, airborne collected data, data from GPS or other passive or active sensors can also be used to more accurately model the roadways into network 200.

As additional information is given to the evacuation route planning tool 118 of the present invention, routing for nodes 304-310 may dynamically be changed, whether upon initial calculation or at a later time. For example, and not by way of limitation, information may come in from sensors in the roads, GPS systems, or other data points, that indicate that arc 314 has a traveling speed of less than 5 miles per hour. The system 114 would take that into account and, depending on the impedance or speed limit capabilities of arcs 350 and 316, dynamically re-route evacuees traveling on arc 346 and/or arc 340 to arc 350 and arc 316 to enter safe zone 302. This re-routing can occur at any time during the evacuation period to maximize the flow and minimize the cost at that given time. By taking additional information into account during the evacuation, routes can be re-determined based on new or more current information available to AGTM system 114.

Preventative and Predictive Use

The evacuation routes determined by the AGTM system 114 of the present invention can also be used to overcome infirmities of the actual road network in a given geographic location. Hypothetical situations can be entered into the AGTM system 114 and routes calculated based on the hypothetical situation. Areas of congestion, e.g., minimal flow and/or maximum cost can be determined and improvements of those areas can be undertaken to reduce the effect of those areas on the evacuation plan. For example, and not by way of limitation, if it is determined that a given roadway is the limiting factor between a hypothetical evacuation zone 300 and a hypothetical safe zone 302, that roadway can be expanded to include additional lanes of traffic such that it no longer presents a limitation on the evacuation process for that given evacuation zone 300. Further, if that roadway cannot be expanded in such a fashion, studies can be undertaken to create additional roadways from the hypothetical evacuation zone 300 to reduce the burden on any given roadway. Such planning tools are useful not only for emergency planning, but for overall traffic flow from a given area, especially areas that are prone to traffic jams such as bridges, tunnels, and other geographic areas that have limited traffic access.

The present invention can also be used to plan other municipal undertakings, such as the construction of new fire houses or evacuation shelters. Since the present invention can determine the amount of time it takes to evacuate a given evacuation area 300 via the available roads, if that time is unacceptable from a safety or other standpoint, the AGTM system 114 can determine a new safe zone 302 that can be used for that given evacuation zone 300 or emergency.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The present invention describes a GIS-based system that determines evacuation routes for specific areas requiring evacuation. Evacuation and safe areas are determined, and evacuation routes plotted, based on emergency-specific information as well as road flow and estimated time of travel for each section of road between the evacuation area and safe area. Routes, evacuation areas, and safe areas are dynamically calculated and recalculated based on additional data, either real-time, historical, or other data added to the system, to compute optimal initial routes and redirect evacuees if changes in the emergency situation occur.

In summary, embodiments of the invention provide methods and apparatuses for determining evacuation routes for an emergency situation using a geographical information systems (GIS) database that represents a geographical area, wherein the GIS database includes at least one node representing at least one geographical location within the geographic area and at least one arc representing at least one street within the geographic area. A method in accordance with the present invention comprises determining an evacuation area within the geographic area, the evacuation area containing at least one node, determining a safe area within the geographic area, the safe area containing at least one node, dynamically determining at least one evacuation route between the evacuation area and the safe area, the evacuation route containing at least one arc, wherein the evacuation route is determined by maximizing a traffic flow between the evacuation area and the safe area, and minimizing a cost between the evacuation area and the safe area.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A method for determining evacuation routes for an emergency situation using a geographical information systems (GIS) database that represents a geographical area, wherein the GIS database includes at least one node representing at least one geographical location within the geographic area and at least one arc representing at least one street within the geographic area, comprising:
    determining an evacuation area within the geographic area, the evacuation area containing at least one node;
    determining a safe area within the geographic area, the safe area containing at least one node;
    dynamically determining at least one evacuation route between the evacuation area and the safe area, the evacuation route containing at least one arc, wherein the evacuation route is determined by:
        maximizing a traffic flow between the evacuation area and the safe area; and
        minimizing a cost between the evacuation area and the safe area.

2. The method of claim 1, wherein the evacuation route is determined based on one or more of: time of day, road sensors, airborne collected data, change in the emergency situation, and routes used by emergency personnel to attend to the emergency situation.

3. The method of claim 1, wherein a new evacuation route is determined based on at least one data point received after the evacuation route was originally determined.

4. The method of claim 1, wherein a new evacuation route for a second user is determined using data collected from a first user.

5. The method of claim 1, wherein the cost is defined as a road impedance associated with arcs used in the determined evacuation route.

6. The method of claim 1, wherein the flow is defined as a number of lanes of traffic possible on the arc used in the determined evacuation route.

7. An apparatus for determining evacuation routes for an emergency situation using a geographical information systems (GIS) database that represents a geographical area, wherein the GIS database includes at least one node representing at least one geographical location within the geographic area and at least one arc representing at least one street within the geographic area, comprising:
    a computer system having a memory and a data storage device coupled thereto;
    one or more programs, performed by the computer, for
    determining an evacuation area within the geographic area, the evacuation area containing at least one node;
    determining a safe area within the geographic area, the safe area containing at least one node;
    dynamically determining at least one evacuation route between the evacuation area and the safe area, the evacuation route containing at least one arc, wherein the evacuation route is determined by:
        maximizing a traffic flow between the evacuation area and the safe area; and
        minimizing a cost between the evacuation area and the safe area.

8. The apparatus of claim 7, wherein the evacuation route is determined based on one or more of: time of day, road sensors, airborne collected data, change in the emergency situation, and routes used by emergency personnel to attend to the emergency situation.

9. The apparatus of claim 7, wherein a new evacuation route is determined based on at least one data point received after the evacuation route was originally determined.

10. The apparatus of claim 7, wherein a new evacuation route for a second user is determined using data collected from a first user.

11. The apparatus of claim 7, wherein the cost is defined as a road impedance associated with arcs used to determine the evacuation route.

12. The apparatus of claim 7, wherein the flow is defined as a number of lanes of traffic possible on the arc used in the determined evacuation route.

13. An article of manufacture comprising a program storage medium readable by a computer and embodying one or more instructions executable by the computer to perform a method for determining evacuation routes for an emergency situation using a geographical information systems (GIS) database that represents a geographical area, wherein the GIS database includes at least one node representing at least one geographical location within the geographic area and at least one arc representing at least one street within the geographic area, the method comprising:
    determining an evacuation area within the geographic area, the evacuation area containing at least one node;
    determining a safe area within the geographic area, the safe area containing at least one node;
    dynamically determining at least one evacuation route between the evacuation area and the safe area, the evacuation route containing at least one arc, wherein the evacuation route is determined by:
        maximizing a traffic flow between the evacuation area and the safe area; and minimizing a cost between the evacuation area and the safe area.

14. The article of manufacture of claim 13, wherein the evacuation route is determined based on one or more of: time of day, road sensors, airborne collected data, change in the emergency situation, and routes used by emergency personnel to attend to the emergency situation.

15. The article of manufacture of claim 13, wherein a new evacuation route is determined based on at least one data point received after the evacuation route was originally determined.

16. The article of manufacture of claim 13, wherein a new evacuation route for a second user is determined using data collected from a first user.

17. The article of manufacture of claim 13, wherein the cost is defined as a road impedance associated with arcs used to determine the evacuation route.

18. The article of manufacture of claim 13, wherein the flow is defined as a number of lanes of traffic possible on the arc used in the determined evacuation route.

* * * * *